(12) United States Patent
Matsumura et al.

(10) Patent No.: US 12,375,158 B2
(45) Date of Patent: Jul. 29, 2025

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/266,744

(22) PCT Filed: Aug. 9, 2018

(86) PCT No.: PCT/JP2018/029973
§ 371 (c)(1),
(2) Date: Feb. 8, 2021

(87) PCT Pub. No.: WO2020/031343
PCT Pub. Date: Feb. 13, 2020

(65) Prior Publication Data
US 2021/0314053 A1    Oct. 7, 2021

(51) Int. Cl.
*H04B 7/08*       (2006.01)
*H04B 7/06*       (2006.01)
*H04W 16/28*      (2009.01)
*H04W 24/08*      (2009.01)
*H04W 76/19*      (2018.01)

(52) U.S. Cl.
CPC .......... *H04B 7/088* (2013.01); *H04B 7/0617* (2013.01); *H04B 7/0695* (2013.01); *H04W 16/28* (2013.01); *H04W 24/08* (2013.01); *H04W 76/19* (2018.02)

(58) Field of Classification Search
CPC .... H04B 7/088; H04B 7/0695; H04B 7/0408; H04B 7/0617; H04B 17/373; H04W 16/28; H04W 24/08; H04W 76/19; H04W 72/046; H04L 5/001; H04L 5/0025; H04L 5/0053;
(Continued)

(56) References Cited

U.S. PATENT DOCUMENTS 11,050,478 B2 *  6/2021  Guo ................. H04B 7/088
11,576,198 B2 *  2/2023  Lee ................. H04W 48/04
(Continued)

OTHER PUBLICATIONS

Qualcomm: "Beam failure recovery procedure", 3GPP Draft; R1-1804788 , Sanya, China, Apr. 16-Apr. 20, 2018.*
(Continued)

*Primary Examiner* — Raj Jain
(74) *Attorney, Agent, or Firm* — Osha Bergman Watanabe & Burton LLP

(57) ABSTRACT

As for appropriate settings in the case of configuration in which search space other than search space for a beam failure recovery request response (BFRQR) signal is monitored in a beam recovery procedure of a future radio communication system, one aspect of a user terminal of the present disclosure includes: a control section that controls monitor setting related to first search space and second search space other than the first search space in accordance with a carrier for which the first search space for a beam failure recovery request response signal is set; and a receiving section that monitors at least one of the first search space and the second search space based on the setting.

4 Claims, 9 Drawing Sheets

(58) Field of Classification Search
CPC ............ H04L 27/26025; H04L 27/261; H04L 5/0048

See application file for complete search history.

(56) References Cited

U.S. PATENT DOCUMENTS

| | | | |
|---|---|---|---|
| 2018/0007574 A1 | 1/2018 | Park et al. | |
| 2019/0190582 A1* | 6/2019 | Guo | H04L 1/0061 |
| 2019/0222391 A1* | 7/2019 | Lee | H04W 72/23 |
| 2020/0100301 A1* | 3/2020 | Kusashima | H04W 74/06 |
| 2020/0221428 A1* | 7/2020 | Moon | H04L 1/0046 |
| 2021/0058998 A1* | 2/2021 | Yuan | H04W 72/21 |
| 2021/0153074 A1* | 5/2021 | Yang | H04L 5/0053 |
| 2021/0266909 A1* | 8/2021 | Lin | H04L 5/0053 |
| 2021/0314053 A1* | 10/2021 | Matsumura | H04L 5/001 |
| 2022/0104185 A1* | 3/2022 | Moon | H04L 1/1822 |
| 2022/0104282 A1* | 3/2022 | Kusashima | H04L 5/0048 |
| 2024/0322891 A1* | 9/2024 | Cirik | H04L 1/1832 |

OTHER PUBLICATIONS

International Search Report issued in PCT/JP2018/029973 on Oct. 23, 2018 (1 page).

Written Opinion of the International Searching Authority issued in PCT/JP2018/029973 on Oct. 23, 2018 (3 pages).

ETSI TS 136 300 V14.5.0; "LTE; Evolved Universal Terrestrial Radio Access (E-UTRA) and Evolved Universal Terrestrial Radio Access Network (E-UTRAN); Overall description; Stage 2 (3GPP TS 36.300 version 14.5.0 Release 14)"; Jan. 2018; (346 pages).

Extended European Search Report issued in counterpart European Patent Application No. 18929230.3, mailed on Mar. 2, 2022 (7 pages).

NTT Docomo, Inc.; "Discussion on NR RLM and RLF"; 3GPP TSG RAN WG1 Meeting #89, R1-1708446; Hangzhou, P.R. China, May 15-19, 2017 (7 pages).

Qualcomm; "Beam failure recovery procedure"; 3GPP TSG-RAN WG1 #92b, R1-1804788; Sanya, China, Apr. 16-20, 2018 (10 pages).

Office Action issued in the counterpart Russian Patent Application No. 2021104277/07(009276), mailed on Mar. 23, 2022 (12 pages).

Office Action issued in Chinese Application No. 201880098527.9 mailed on Jun. 26, 2023 (13 pages).

Office Action issued in Indian Application No. 202137005539 mailed on Oct. 19, 2022 (7 pages).

Office Action issued in Japanese Application No. 2020-535439 mailed on Aug. 23, 2022 (6 pages).

Office Action issued in counterpart Korean Application No. 10-2021-7004452, mailed Apr. 23, 2024 (8 pages).

Office Action issued in European Application No. 18929230.3, dated Jul. 29, 2024 (5 pages).

Office Action issued in New Zealand Application No. 773474, dated Aug. 30, 2024 (3 pages).

\* cited by examiner

USER TERMINAL AND RADIO COMMUNICATION METHOD

TECHNICAL FIELD

The present invention relates to a user terminal and a radio communication method in a next-generation mobile communication system.

BACKGROUND ART

In an existing LTE system (e.g., Rel. 8 to 14), radio link monitoring (RLM), which is monitoring of radio link quality, is performed. When radio link failure (RLF) is detected by the radio link monitoring (RLM), re-establishment of radio resource control (RRC) connection is required of user equipment (UE).

CITATION LIST

Non Patent Literature

Non Patent Literature 1: 3GPP TS 36.300 V14.5.0 "Evolved Universal Terrestrial Radio Access (E-UTRA) and Evolved Universal Terrestrial Radio Access Network (E-UTRAN); Overall description; Stage 2 (Release 14)", December 2017.

SUMMARY OF INVENTION

Technical Problem

Performing a procedure of switching a specific beam to another beam at the time when quality of the specific beam deteriorates in order to inhibit occurrence of radio link failure (RLF) in a future radio communication system (e.g., Rel.15, New Radio (NR)) is being considered.

It is not clear whether a user terminal monitors search space other than search space for a beam failure recovery request (BFRQ) request (BFRQR) signal in a beam recovery procedure of a future radio communication system.

The present invention has been made in view of such a point, and one of objects thereof is to provide a user terminal and a radio communication method capable of appropriately controlling settings in the case of configuration in which search space other than search space for a beam failure recovery request response (BFRQR) signal is monitored in a beam recovery procedure of a future radio communication system.

Solution to Problem

One aspect of a user terminal of the present invention includes: a control section that controls monitor setting related to first search space and second search space other than the first search space in accordance with a carrier for which the first search space for a beam failure recovery request response signal is set; and a receiving section that monitors at least one of the first search space and the second search space based on the setting.

Advantageous Effects of Invention

According to the present invention, settings can be appropriately controlled in the case of configuration in which search space other than search space for a beam failure recovery request response (BFROR) signal is monitored in a beam recovery procedure of a future radio communication system.

DESCRIPTION OF EMBODIMENTS

Figure 1:
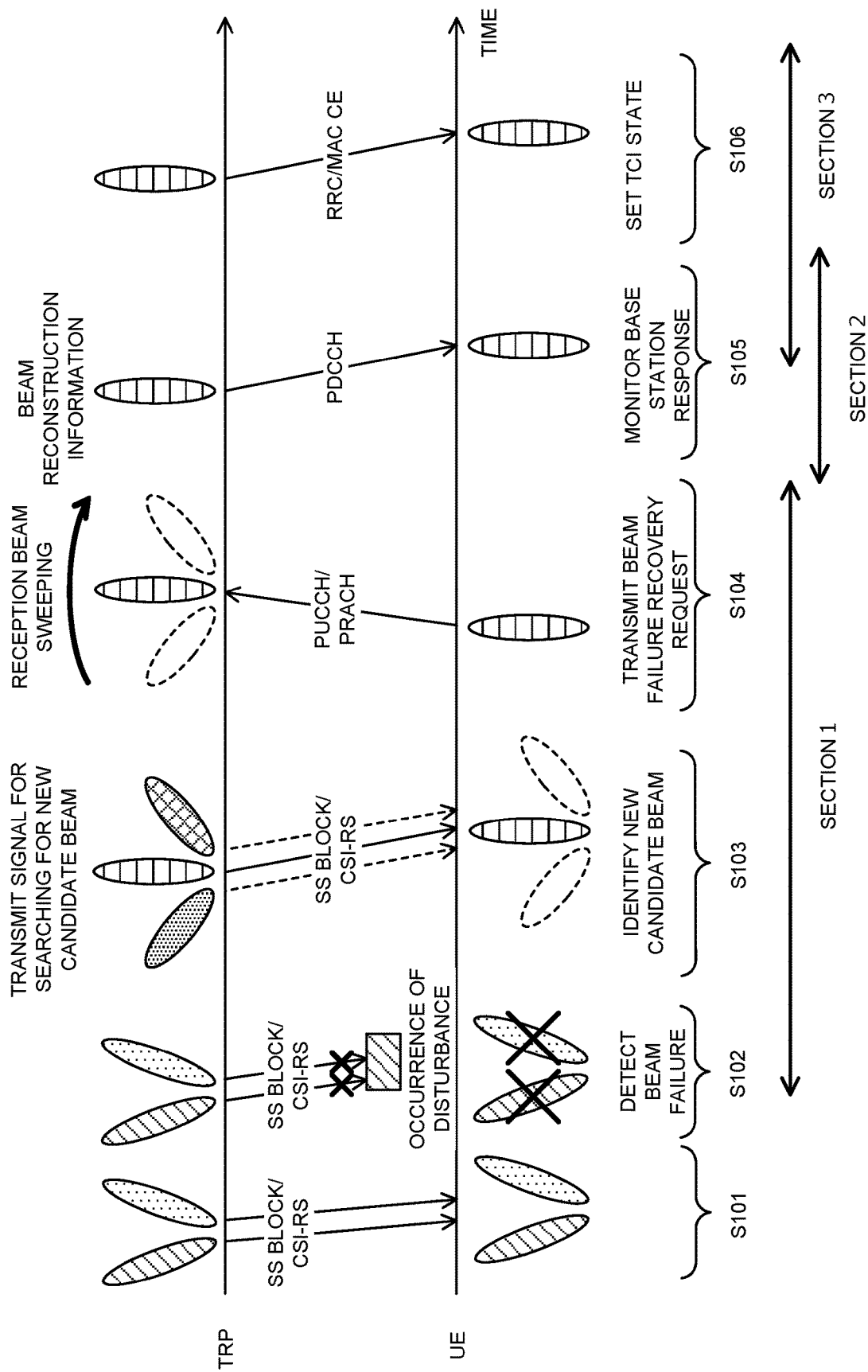
FIG. 1 illustrates one example of a beam recovery procedure in a future radio communication system.

Using beam forming (BF) for communication in a future radio communication system (e.g., 5G, 5G+, NR, or Rel.15 or later) is being considered. In order to improve communication quality by using beam forming (BF), controlling at least one of transmission and reception of a signal is being considered in view of a relation of quasi-co-location (QCL) (QCL relation) between a plurality of signals.

The quasi-co-location (QCL) is an indicator indicating the statistical properties of a channel. For example, the fact that a certain signal or channel and another signal or channel have the relation of quasi-co-location (QCL) may mean that at least one of Doppler shift, Doppler spread, average delay, delay spread, and a space parameter (e.g., space reception parameter) can be supposed (assumed) to be the same, that is, at least one thereof can be supposed (assumed) to be quasi-co-location (QCL) between these different plurality of signals or channels.

The space reception parameter may correspond to a reception beam of a user terminal (e.g., reception analog beam), and the beam may be identified based on spatial QCL. The QCL and at least one element of QCL in the present disclosure may be replaced with spatial QCL (sQCL).

A plurality of QCL types may be specified. For example, four QCL types (QCL types A to D) of different parameters or parameter sets that can be assumed to be the same may be provided.

In the QCL type A, Doppler shift, Doppler spread, average delay, and delay spread can be assumed to be the same.

In the QCL type B, Doppler shift and Doppler spread can be assumed to be the same.

In the QCL type C, average delay and Doppler shift can be assumed to be the same.

In the QCL type D, space reception parameter can be assumed to be the same.

Controlling channel transmission/reception processing based on the state of a transmission configuration indicator (TCI) (TCI state) in a future radio communication system is being considered.

The TCI state may indicate QCL information. Alternatively, the TCI state may contain the QCL information. At least one of the TCI state and the QCL information may be information on QCL of a target channel or a reference signal for the channel and another signal (e.g., another downlink reference signal). The information on QCL may contain at least one of, for example, information on the downlink reference signal that is the QCL and information indicating the above-described QCL types.

When beam forming (BF) is used, disturbance caused by an obstacle easily has influence, which can lead to poor radio link quality and frequent occurrence of radio link failure (RLF). When radio link failure (RLF) occurs, cell reconnection is needed, and thus frequent occurrence of radio link failure (RLF) causes reduction in system throughput.

Performing a procedure of switching a specific beam to another beam at the time when quality of the specific beam deteriorates in order to inhibit occurrence of radio link failure (RLF) in a future radio communication system (e.g., NR) is being considered. The procedure of switching to another beam may be referred to as, for example, beam recovery (BR), beam failure recovery (BFR), or layer 1/layer 2 (L1/L2) beam recovery. A beam failure recovery (BFR) procedure may be simply referred to as BFR.

Beam failure in the present disclosure may be referred to as link failure.

FIG. 1 illustrates one example of a beam recovery procedure of a future radio communication system (e.g., Rel.15 NR). The beam number and the like in FIG. 1 are examples, and are not limited thereto.

In an initial state (step S101) in FIG. 1, a user terminal performs measurement based on reference signal (RS) resources transmitted from a transmission/reception point (TRP) by using two beams. The reference signal may be at least one of a synchronization signal block (SSB) and a channel state measurement reference signal (channel state information RS (CSI-RS)). The synchronization signal block (SSB) may be referred to as a synchronization signal/physical broadcast channel (SS/PBCH) block.

The reference signal may be at least one of a primary synchronization signal (primary SS (PSS)), a secondary synchronization signal (secondary SS (SSS)), a mobility reference signal (mobility RS (MRS)), a synchronization signal block (SSB), a signal contained in the SSB, a CSI-RS, a demodulation reference signal (demodulation RS (DMRS)), and a beam-specific signal, or a signal configured by expanding or changing these signals. The reference signal measured in step S101 may be referred to as a beam failure detection reference signal (beam failure detection RS (BFD-RS)).

In step S102 in FIG. 1, the user terminal cannot detect the beam failure detection reference signal (BFD-RS) since a radio wave from the transmission/reception point (TRP) is disturbed. An obstacle between the user terminal and the transmission/reception point (TRP) and influence due to, for example, fading or interference cause such disturbance.

The user terminal detects beam failure when a given condition is satisfied. When a block error rate (BLER) is less than a threshold, the user terminal may detect the occurrence of beam failure for all of set beam failure detection reference signals (BFD-RSS) (BFD-RS resource settings). When the occurrence of beam failure is detected, a lower layer (physical layer) of the user terminal may notify (instruct) a higher layer (MAC layer) of (in) a beam failure instance.

A reference (criterion) for determining detection of the occurrence of beam failure is not limited to the block error rate (BLER), and may be physical layer reference signal received power (L1-RS received power (L1-RSRP)). Instead of or in addition to reference signal (RS) measurement, beam failure may be detected based on, for example, a downlink control channel (physical downlink control channel (PDCCH)). The beam failure detection reference signal (BFD-RS) may be expected to be a quasi-co-location (QCL) with a DMRS of the PDCCH monitored by the user terminal.

Information on the beam failure detection reference signal (BFD-RS) such as an index, resources, the number, the port number, and precoding of a reference signal and information on beam failure detection (BFD) such as the above-described threshold may be set (announced) to the user terminal by using higher layer signaling. The information on the beam failure detection reference signal (BFD-RS) may be referred to as information on resources for BFD.

The higher layer signaling may be, for example, any one of radio resource control (RRC) signaling, medium access control (MAC) signaling, and broadcast information or a combination thereof.

The MAC layer of the user terminal may start a given timer when receiving a beam failure instance notification from the physical layer of the user terminal. The timer may be referred to as a beam failure detection timer. The MAC layer of the user terminal may trigger the beam failure recovery (BFR) (e.g., start any of the later-described random access procedures) when receiving beam failure instance notifications a certain number or more times (e.g., beamFailureInstanceMaxCount set in RRC) until the expiration of the timer.

When receiving no notification from the user terminal or receiving a given signal (beam failure recovery request in step S104) from the user terminal, the transmission/reception point (TRP) may determine that the user terminal has detected beam failure.

In step S103 in FIG. 1, the user terminal starts searching for a new candidate beam to be newly used for communication for beam recovery. The user terminal may select a new candidate beam corresponding to the reference signal (RS) by measuring a given reference signal (RS). The reference signal (RS) measured in step S103 may be referred to as a new candidate beam identification reference signal (new candidate beam identification RS (NCBI-RS)). The new candidate beam identification reference signal (NCBI-RS) may be the same as or different from the beam failure detection reference signal (BFD-RS). The new candidate beam may be simply referred to as a candidate beam.

The user terminal may determine a beam corresponding to a reference signal (RS) that satisfies a given condition as a new candidate beam. For example, the user terminal may determine the new candidate beam based on a reference signal (RS), whose physical layer reference signal received power (L1-RSRP) exceeds a threshold, among set new candidate beam identification reference signals (NCBI-RSs). The reference (criterion) for determining a new candidate beam is not limited to the L1-RSRP. The L1-RSRP regarding a synchronization signal block (SSB) may be referred to as SS-RSRP. The L1-RSRP regarding a CSI-RS may be referred to as CSI-RSRP.

Information on the new candidate beam identification reference signal (NCBI-RS) such as resources, the number, the port number, and precoding of a reference signal and information on new candidate beam identification (NCBI) such as the above-described threshold may be set (announced) to the user terminal via higher layer signaling. Information on the new candidate beam identification reference signal (NCBI-RS) may be acquired by the user terminal based on information on a beam failure detection reference signal (BFD-RS). The information on the new candidate beam identification reference signal (NCBI-RS) may be referred to as information on resources for new candidate beam identification (NCBI).

The beam failure detection reference signal (BFD-RS) and the new candidate beam identification reference signal (NCBI-RS) may be replaced with a radio link monitoring reference signal (radio link monitoring RS (RLM-RS)).

In step S104 in FIG. 1, the user terminal that has identified a new candidate beam transmits a beam failure recovery request (BFRQ) to the transmission/reception point (TRP). The beam failure recovery request (BFRQ) may be referred to as, for example, a beam recovery request signal or a beam failure recovery request signal.

The beam failure recovery request (BFRQ) may be transmitted by using at least one of an uplink control channel (physical uplink control channel (PUCCH)), a random access channel (physical random access channel (PRACH)), an uplink shared channel (physical uplink shared channel (PUSCH)), and a set grant (configured grant) PUSCH.

The beam failure recovery request (BFRQ) may contain information on the new candidate beam identified in step S103. Resources for the beam failure recovery request (BFRQ) may be associated with the new candidate beam. Beam information may be announced by using, for example, a beam index (BI), a port index of a given reference signal, a resource index (e.g., CSI-RS resource indicator), or a synchronization signal block (SSB) resource indicator (SSBRI).

Contention-based BFR (CB-BFR) and contention-free BFR (CF-BFR) in a future radio communication system (e.g., Rel.15 NR) are being considered. The CB-BFR is beam failure recovery (BFR) based on a contention based random access procedure. The CF-BFR is beam failure recovery (BFR) based on a non-contention based random access procedure. In the CR-BFR and the CF-BFR, the user terminal may transmit a preamble as a beam failure recovery request (BFRQ) by using PRACH resources. The preamble may be referred to as a random access (RA) preamble, a random access channel (PRACH), or a RACH preamble.

In the beam failure recovery based on a contention based random access procedure (CB-BFR), the user terminal may transmit a preamble randomly selected from one or a plurality of preambles. In the beam failure recovery based on a non-contention based random access procedure (CF-BFR), the user terminal may transmit a preamble assigned by a base station in a UE-specified manner. In the CB-BFR, the base station may assign the same preambles to a plurality of user terminals. In the CF-BFR, the base station may individually assign a preamble to a user terminal.

The beam failure recovery based on a contention based random access procedure (CB-BFR) may be referred to as contention-based PRACH-based BFR (CB PRACH-based BFR (CBRA-BFR)). The beam failure recovery based on a non-contention based random access procedure (CF-BFR) may be referred to as contention-free PRACH-based BFR (CF PRACH-based BFR (CFRA-BFR)). The CBRA-BFR may be referred to as CBRA for BFR. The CFRA-BFR may be referred to as CFRA for BFR.

In the beam failure recovery based on a contention based random access procedure (CB-BFR), the base station is not required to have capability to identify from which user terminal a preamble has been transmitted when receiving the preamble as a beam failure recovery request (BFRQ). The base station can identify an identifier (e.g., cell-radio network temporary identifier (C-RNTI)) of the user terminal that has transmitted the preamble by performing contention resolution within a period from the beam failure recovery request (BFRQ) to completion of beam reconfiguration.

A signal (e.g., preamble) transmitted by the user terminal in a random access procedure may be assumed to be a beam failure recovery request (BFRQ).

Information on PRACH resources (RA preamble) may be announced by the higher layer signaling (e.g., RRC signaling) in any of the beam failure recovery based on a contention based random access procedure (CB-BFR) and the beam failure recovery based on a non-contention based random access procedure (CF-BFR). For example, the information may contain information indicating the correspondence relation between a detected DL-RS (beam) and the PRACH resources, and different PRACH resources may be associated with each DL-RS.

Detection of beam failure may be performed at the MAC layer. The user terminal may determine that contention resolution is successful when receiving a PDCCH corresponding to a C-RNTI regarding the user terminal in relation to the beam failure recovery based on a contention based random access procedure (CB-BFR).

Random access (RA) parameters of the beam failure recovery based on a contention based random access procedure (CB-BFR) and the beam failure recovery based on a non-contention based random access procedure (CF-BFR) may be configured by the same parameter set, or have different set values.

For example, a parameter (ResponseWindowSize-BFR) indicating the time length for gNB response monitoring in a control resource set (CORESET) for beam failure recovery response after a beam failure recovery request (BFRQ) may be applied to only one of the beam failure recovery based on a contention based random access procedure (CB-BFR) and the beam failure recovery based on a non-contention based random access procedure (CF-BFR).

In step S105 of FIG. 1, a transmission/reception point (e.g., base station) that has detected a beam failure recovery request (BFRQ) transmits a response signal to the beam failure recovery request (BFRQ) from the user terminal. The response signal may be referred to as a gNB response. The response signal may include reconfiguration information (e.g., DL-RS resource construction information) on one or a plurality of beams.

The response signal may be transmitted in, for example, user terminal shared search space of a PDCCH. The response signal may be announced by using an identifier of the user terminal, for example, a PDCCH subjected to cyclic redundancy check (CRC) scramble with a C-RNTI or downlink control information (DCI). The user terminal may determine at least one of a Tx beam and a reception beam to be used based on beam reconfiguration information.

The user terminal may monitor the response signal in search space for a beam failure recovery request response (BFRQR) signal. The user terminal may monitor the response signal based on at least one of a CORESET for beam failure recovery (BFR) and a search space set for the beam failure recovery (BFR).

The user terminal may determine that contention resolution is successful when receiving a PDCCH corresponding to a C-RNTI regarding the user terminal in relation to the beam failure recovery based on a contention based random access procedure (CB-BFR).

A period for the user terminal to monitor a response from the transmission/reception point (TRP) to the beam failure recovery request (BFRQ) may be set in the processing in step S105. The period may be referred to as, for example, a gNB response window, a gNB window, or a beam failure recovery request response window.

In the case of the beam failure recovery based on a random access procedure, the period may be referred to as a random access response (RAR) window.

When no gNB response is detected in the window period, the user terminal may retransmit the beam failure recovery request (BFRQ).

Control of reception of a PDCCH mapped in given resource units of the CORESET based on a TCI state indicating (or containing) information on the QCL of the CORESET with a user terminal in a future radio communication system is being considered.

In step S106 in FIG. 1, the transmission/reception point (e.g., base station) sets one or a plurality of (K) TCI states for each CORESET by higher layer signaling. The user terminal activates one or a plurality of TCI states for each CORESET by using a MAC control element (CE).

After step S106, the user terminal may transmit a message to announce the completion of beam reconfiguration to the transmission/reception point (TRP). The message may be transmitted by, for example, a PUCCH or a PUSCH.

Beam recovery success (BR success) may refer to, for example, a case where the processing reaches step S106. Beam recovery failure (BR failure) may correspond to, for example, the fact that beam failure recovery request (BFRQ) transmission reaches the given number of times. The beam recovery failure may correspond to, for example, the expiration of a beam-failure-recovery-timer.

The number of each step in FIG. 1 is merely a number for description. A plurality of steps may be collectively performed, or the order of the steps may be changed. Whether or not to perform a beam failure recovery (BFR) procedure may be set by the user terminal via the higher layer signaling.

In order to monitor a response from the transmission/reception point (e.g., base station) to the beam failure recovery request (BFRQ), the user terminal monitors a PDCCH in the search space for a beam failure recovery request response (BFRQR) signal in step S105 of the beam recovery procedure of a future radio communication system in FIG. 1.

It is not clear whether the user terminal monitors search space other than the search space for a beam failure recovery request response (BFRQR) signal in the beam recovery procedure of a future radio communication system.

For example, the user terminal is considered to monitor search space other than search space associated with the CORESET for beam failure recovery (BFR), for example, search space other than search space for a beam failure recovery request response (BFROR) signal in at least one of sections 1, 2, and 3 in FIG. 1.

The section 1 is a section outside the gNB response window, that is, a section from detection of beam failure to reception of a response signal to a beam failure recovery request (BFRQ). In the section 1, the user terminal is not required to monitor the CORESET, or may monitor the CORESET set before the beam failure detection.

The section 2 is within a range of the gNB response window. In the section 2, the user terminal may monitor only the CORESET for beam failure recovery (BFR), or monitor the CORESET for beam failure recovery (BFR) and the CORESET set before beam failure detection.

The section 3 is a section from the reception of the gNB response to the reconfiguration or activation in the TCI state for a PDCCH. In the section 3, the user terminal may monitor only the CORESET for beam failure recovery (BFR), or monitor the CORESET for beam failure recovery (BFR) and the CORESET set before beam failure detection.

It is assumed that an important PDCCH cannot be detected when the user terminal cannot monitor search space other than the search space for a beam failure recovery request response (BFRQR) signal in a beam recovery procedure of a future radio communication system (e.g., Rel.15 NR).

For example, in an earthquake and tsunami warning system (ETWS) used for emergency earthquake warnings, the presence or absence of update of system information is announced by paging DCI. The user terminal checks the system information by checking paging information. Here, the paging DCI is detected in paging search space (common search space), and has been scrambled with a Paging-RNTI (P-RNTI).

It is assumed that an important PDCCH that, for example, provides an ETWS cannot be detected when the user terminal cannot monitor search space other than the search space for a beam failure recovery request response (BFRQR) signal in a beam recovery procedure of Rel.15 NR.

In contrast, the user terminal performs blind detection for a PDCCH, so that, when a plurality of pieces of search space is set, the number of times of the blind detections and the number of times of pieces of channel estimation processing may exceed the calculation processing capacity of the user terminal.

In a primary cell (PCell), a processing method is being considered. In the processing method, when at least one of the number of times of blind detections and the number of times of pieces of channel estimation processing is equal to or more than a certain value, the user terminal does not perform blind detection for a part of the PDCCH in accordance with a given rule.

In a secondary cell (SCell), there is a possibility that a processing method as in the PCell is not specified. In the case, the base station (e.g., gNB) is required to set at least one of the number of times of blind detections and the number of times of pieces of channel estimation processing of the user terminal not to exceed a certain value.

In the SCell, when the user terminal is configured to monitor search space other than the search space for a beam failure recovery request response (BFRQR) signal, setting of the monitor is necessary in consideration of the calculation processing capacity of the user terminal.

The present inventors specifically considered appropriate setting in the case of configuration in which the user terminal monitors search space other than the search space for a beam failure recovery request response (BFRQR) signal in a beam recovery procedure of a future radio communication system.

The present embodiment will be described in detail below with reference to the accompanying drawings.

(First Aspect)

In a first aspect, a configuration will be considered. In the configuration, the user terminal monitors search space other than search space for a beam failure recovery request response (BFRQR) signal (hereinafter, also referred to as "another piece of search space") in the sections 1, 2, and 3 of the beam recovery procedure of a future radio communication system in FIG. 1.

When the search space for a beam failure recovery request response (BFRQR) signal is set in the PCell, the user terminal may monitor search space other than search space for a beam failure recovery request response (BFRQR) signal (other piece of search space).

In the case, only when the other piece of search space is common search space or paging search space, the user terminal may monitor the other piece of search space.

The configuration as described above allows the above-described processing method in the PCell to be applied, and allows the user terminal to detect an important PDCCH (DCI) for, for example, an ETWS in search space other than search space for a beam failure recovery request response (BFRQR) signal (other piece of search space) while avoiding the occurrence of a situation where a part of the PDCCH is not subject to blind detection.

When the search space for a beam failure recovery request response (BFRQR) signal is set in a primary secondary cell (PSCell) or the SCell, the user terminal is not required to monitor (does not monitor, or is not expected to monitor) search space other than the search space for a beam failure recovery request response (BFRQR) signal.

When at least one of the following conditions (1) to (3) is satisfied, the user terminal may apply settings related to the monitoring. That is, when the following conditions (1) to (3) are not satisfied, the user terminal is not required to monitor search space other than search space for a beam failure recovery request response (BFRQR) signal (other piece of search space).

The condition (1) is that the search space for a beam failure recovery request response (BFRQR) signal and another piece of search space have the same subcarrier spacing (SCS).

The condition (2) is that the search space for a beam failure recovery request response (BFRQR) signal and the other piece of search space have the relation of the QCL type D. The condition is particularly related to a section until a random access response is detected in a random access response (RAR) window.

The condition (3) is that the other piece of search space is common search space (e.g., type 0, 0A, or 2). According to the condition, a paging DCI transmitted in the common search space can be detected.

Figure 2:
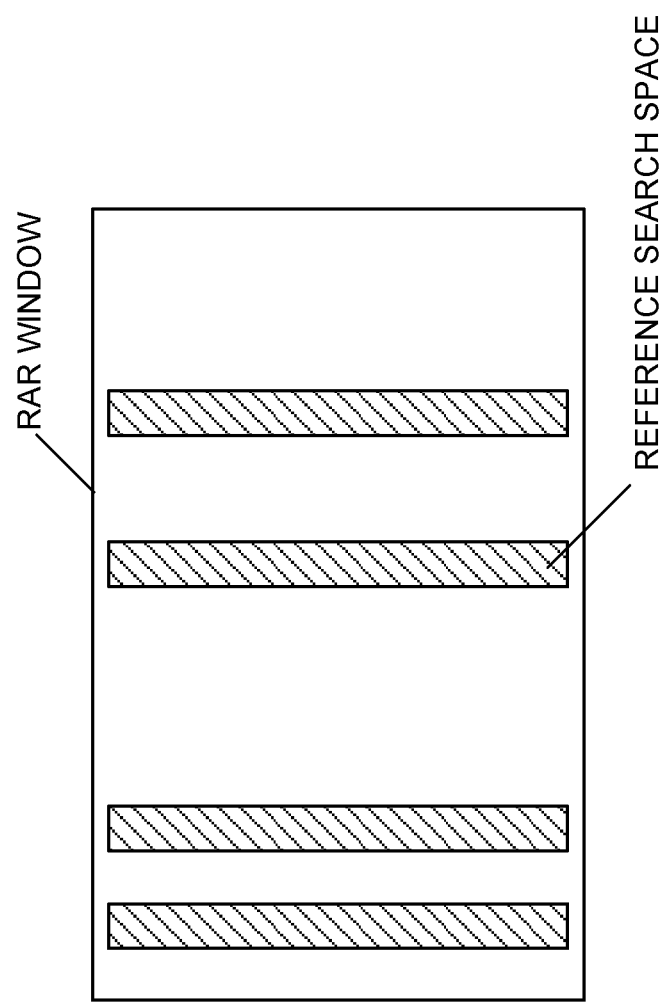
FIG. 2 illustrates the relation between an RAR window and search space in initial access.

FIG. 2 illustrates the relation between an RAR window and search space in initial access. In random access of the initial access, the user terminal may decode at least only one of a PDCCH and a PDSCH of the QCL type D in a part where RAR search space and reference search space overlap with each other in the RAR window.

That is, the user terminal may decode a PDCCH and a PDSCH of type other than the QCL type D in a symbol of a part other than a part where the RAR search space and the reference search space overlap with each other in the RAR window.

The reference search space means type 0-PDCCH common search space, type OA-PDCCH common search space, type 2-PDCCH common search space, or type 3-PDCCH common search space.

According to the first aspect, a configuration in which search space other than the search space for a beam failure recovery request response (BFRQR) signal is monitored can be appropriately set to the user terminal.

(Second Aspect)

In a second aspect, a configuration will be considered. In the configuration, the user terminal monitors search space other than search space for a beam failure recovery request response (BFRQR) signal (another piece of search space) in the sections 1 and 2 of the beam recovery procedure of a future radio communication system in FIG. 1.

When the search space for a beam failure recovery request response (BFROR) signal is set in the PCell, the user terminal may monitor search space other than search space for a beam failure recovery request response (BFRQR) signal.

When the search space for a beam failure recovery request response (BFRQR) signal is set in the PSCell or the SCell, the user terminal is not required to monitor (does not monitor, or is not expected to monitor) search space other than the search space for a beam failure recovery request response (BFRQR) signal.

When at least one of the following conditions (1) to (3) is satisfied, the user terminal may apply settings related to the monitoring. That is, when the following conditions (1) to (3) are not satisfied, the user terminal is not required to monitor search space other than search space for a beam failure recovery request response (BFRQR) signal (other piece of search space).

The condition (1) is that the search space for a beam failure recovery request response (BFRQR) signal and another piece of search space have the same subcarrier spacing (SCS).

The condition (2) is that the search space for a beam failure recovery request response (BFRQR) signal and the other piece of search space have the relation of the QCL type D. The condition is particularly related to a section until a random access response is detected in a random access response (RAR) window.

The condition (3) is that the other piece of search space is common search space (e.g., type 0, 0A, or 2). According to the condition, a paging DCI transmitted in the common search space can be detected.

In the beam recovery procedure, the user terminal is not required to monitor search space as set in the sections 1 and 2 in the section 3 after receiving or detecting a response signal (gNB response) to a beam failure recovery request (BFRQ).

After receiving the response signal (gNB response) to the beam failure recovery request (BFRQ), the base station recognizes connection ability to the user terminal with a beam of the response signal, and thus may transmit an important PDCCH in the search space for a beam failure recovery request response (BFRQR) signal. Alternatively, the base station may transmit the important PDCCH in the search space of the QCL type D together with a response signal to the beam failure recovery request (BFRQ).

Not monitoring search space in the section 3 unlike in the sections 1 and 2 can simplify reception processing of the user terminal and reduce power consumption of the user terminal.

According to the second aspect, a configuration in which search space other than the search space for a beam failure recovery request response (BFROR) signal is monitored can be appropriately set to the user terminal.

<Variations>

The user terminal may report whether or not the user terminal can simultaneously receive a plurality of beams to a network as UE capability.

A user terminal that reports that the user terminal can simultaneously receive a plurality of beams may be assumed to monitor the search space for a beam failure recovery request response (BFROR) signal and another piece of search space, regardless of whether these pieces of search space are of DCL type D.

A user terminal that does not report UE capability of simultaneous reception of a plurality of beams may be assumed to be expected that the user terminal operates similarly to a user terminal that has reported that the user terminal cannot simultaneously receive a plurality of beams.

Figure 3A:
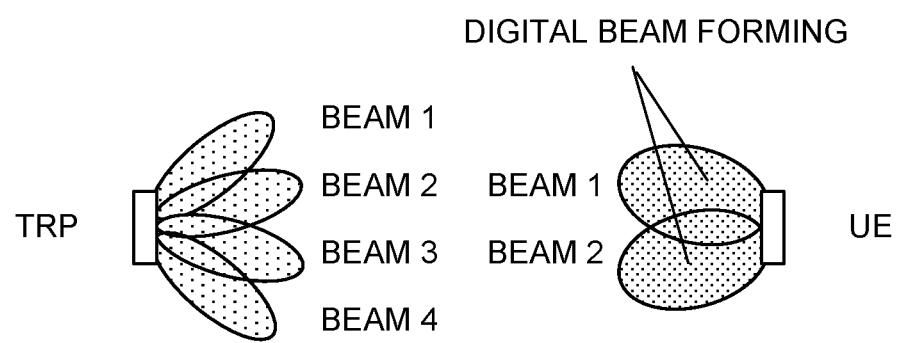
FIGS. 3A and 3B illustrate scenarios assumed when a user terminal can simultaneously receive a plurality of beams.
Figure 3B:
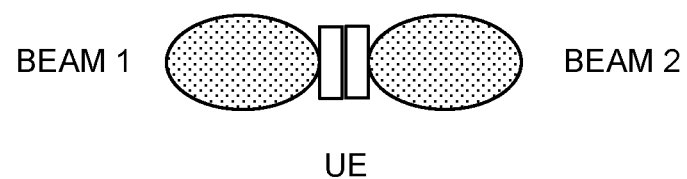

FIG. 3 illustrates a scenario assumed when a user terminal can simultaneously receive a plurality of beams. As illustrated in FIG. 3A, the user terminal capable of simultaneously receiving a plurality of beams is assumed to support digital beams. Alternatively, as illustrated in FIG. 3B, the user terminal capable of simultaneously receiving a plurality of beams is assumed to hold a multipanel.

In a beam recovery procedure, a response signal to a beam failure recovery request (BFRQ) may not only announce whether or not beam failure recovery (BFR) is completed in one bit, but announce DL assignment of a PDSCH for setting the TCI state of a PDCCH.

Similarly, the DL assignment of a PDSCH for setting beam information (TCI state) of the PDSCH or beam information (spatial relation information) of a PUCCH may be announced.

The beam information (TCI state or spatial relation information) is selected by the DCI or a MAC CE, and updated by RRC. For example, since a PDSCH contains the MAC CE, DL assignment for assigning the PDSCH is announced.

In the beam recovery procedure, a response signal to a beam failure recovery request (BFRQ) may not only announce whether or not beam failure recovery (BFR) is completed in one bit, but announce DL assignment for selecting the TCI state of a PDSCH. At the same time, resource assignment for a PDSCH may be performed.

In the beam recovery procedure, a response signal to a beam failure recovery request (BFRQ) may not only announce whether or not beam failure recovery (BFR) is completed in one bit, but contain an instruction for invoking a beam report of an aperiodic CSI (A-CSI) report or a semi-persistent CSI (SP-CSI) report.

Such an instruction allows the user terminal to perform beam reporting at the same time as the beam failure recovery (BFR) is completed, so that a network can select the most suitable beam at high speed, and notify the user terminal of the beam. That is, the time from beam failure recovery (BFR) to optimum beam selection can be shortened.

(Radio Communication System)

The configuration of a radio communication system according to the present embodiment will be described below. In the radio communication system, a radio communication method according to the above-described present embodiment is applied.

Figure 4:
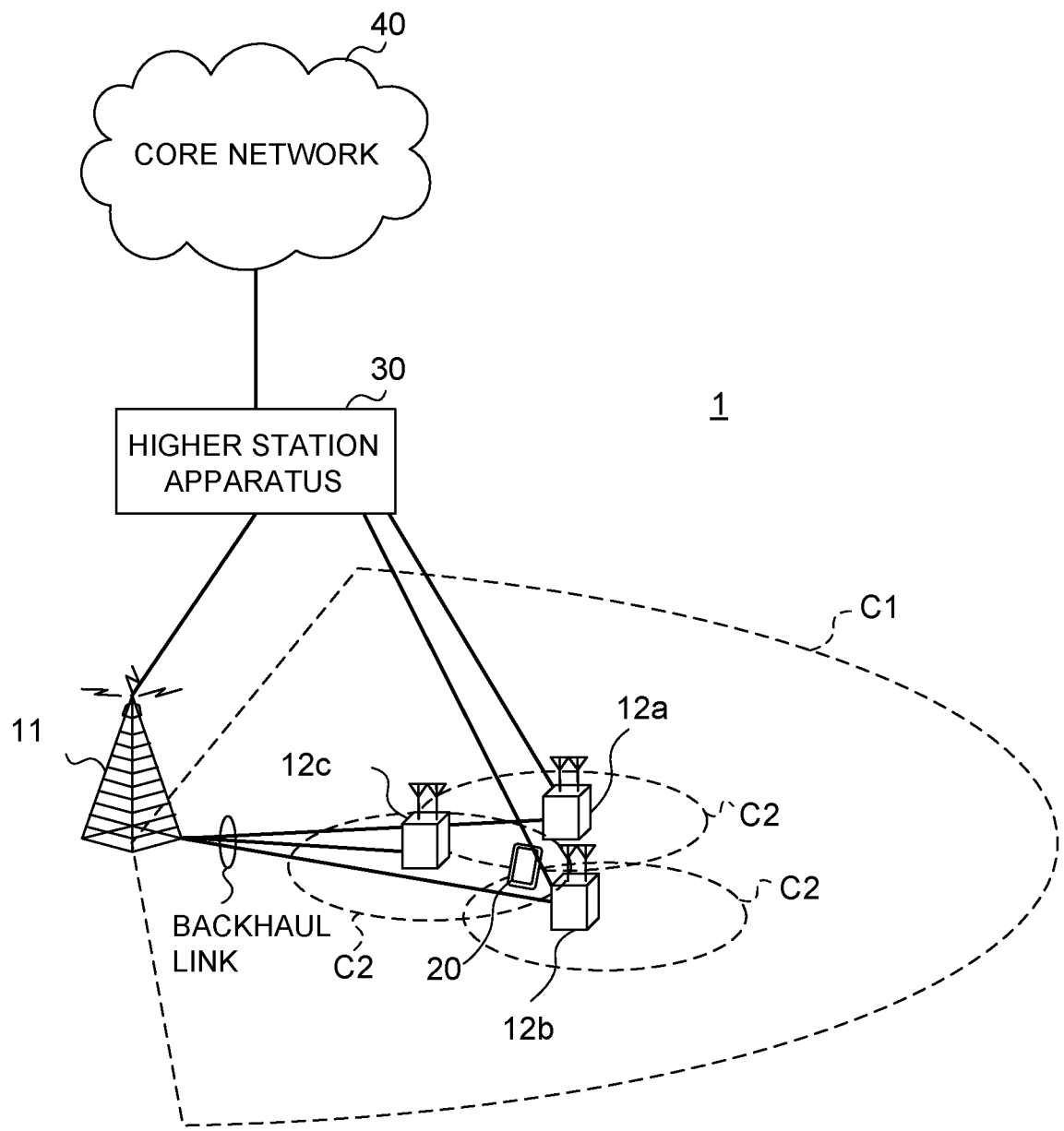
FIG. 4 illustrates one example of a schematic configuration of a radio communication system according to the present embodiment.

FIG. 4 illustrates one example of a schematic configuration of the radio communication system according to the present embodiment. In a radio communication system 1, carrier aggregation (CA) or dual connectivity (DC) can be applied. In the CA or the DC, a plurality of fundamental frequency blocks (component carriers (CCs)) is integrated with each other. A system bandwidth (e.g., 20 MHz) of an LTE system is used as one unit for the plurality of fundamental frequency blocks. The radio communication system 1 may be referred to as, for example, SUPER 3G, LTE-Advanced (LTE-A), IMT-Advanced, 4G, 5G, future radio access (FRA), and New Radio (NR).

The radio communication system 1 includes a base station 11 and base stations 12a to 12c. The base station 11 forms a macro cell C1. The base stations 12a to 12c are disposed in the macro cell C1, and form small cells C2 smaller than the macro cell C1. A user terminal 20 is disposed in the macro cell C1 and each small cell C2. A configuration in which different numerologies are applied between cells may be adopted. The numerology refers to a signal design in certain RAT or a set of communication parameters that characterize the RAT design.

The user terminals 20 can connect with both the base station 11 and the base station 12. The user terminal 20 is assumed to simultaneously use the macro cell C1 and the small cells C2, which use different frequencies, by the carrier aggregation (CA) and the dual connectivity (DC). The user terminal 20 can apply the carrier aggregation (CA) or the dual connectivity (DC) by using a plurality of cells (CCs) (e.g., two or more CCs). The user terminal can use a licensed band CC and an unlicensed band CC as the plurality of cells. A configuration in which any of the plurality of cells includes a TDD carrier can be adopted. A shortened TTI is applied to the TDD carrier.

Communication can be performed between the user terminal 20 and the base station 11 by using a carrier having a narrow bandwidth (referred to as, for example, an existing carrier or a legacy carrier) in a relatively low frequency band (e.g., 2 GHZ). A carrier having a wide bandwidth may be used in a relatively high frequency band (e.g., 3.5 GHZ, 5 GHZ, and 30 to 70 GHZ) and the same carrier as that used between the user terminal 20 and the base station 11 may be used between the user terminal 20 and the base station 12. The configuration of the frequency band used by each base station is not limited thereto.

The base station 11 and the base station 12 (or two base stations 12) can be connected by wire (e.g., by an optical fiber compliant with a common public radio interface (CPRI) and an X2 interface), or connected wirelessly.

The base station 11 and each of the base stations 12 are connected with a host station apparatus 30, and connected with a core network 40 via the host station apparatus 30. Although the host station apparatus 30 includes, for example, an access gateway apparatus, a radio network controller (RNC), and a mobility management entity (MME), these are not limitations. Each of the base stations 12 may be connected with the host station apparatus 30 via the base station 11.

The base station 11 has a relatively wide coverage, and may be referred to as, for example, a macro base station, an aggregate node, an eNodeB (eNB), and a transmission/reception point. The base station 12 has a local coverage, and may be referred to as, for example, a small base station, a micro base station, a pico base station, a femto base station, a home eNodeB (HeNB), a remote radio head (RRH), and a transmission/reception point. The base stations 11 and 12 will be collectively referred to as base stations 10 unless being distinguished.

Each user terminal 20 supports various communication methods such as LTE and LTE-A, and may include not only a mobile communication terminal but a fixed communication terminal.

In the radio communication system 1, orthogonal frequency division multiple access (OFDMA) can be applied to a downlink (DL), and single carrier-frequency division multiple access (SC-FDMA) can be applied to an uplink (UL) as a radio access method. The OFDMA is a multi-carrier transmission system in which communication is performed by dividing a frequency band into a plurality of narrow frequency bands (subcarriers) and mapping data to each subcarrier. The SC-FDMA is a single carrier transmission system in which interference between terminals is reduced by dividing a system bandwidth into bands composed of one or a sequence of resource blocks for each terminal and causing a plurality of terminals to use different bands. The radio access methods of the uplink and the downlink are not limited to these combinations, and the OFDMA may be used in the uplink.

In the radio communication system 1, for example, a downlink data channel (physical downlink shared channel (PDSCH), also referred to as, for example, a downlink shared channel) shared by the user terminals 20, a broadcast channel (physical broadcast channel (PBCH)), and an L1/L2 control channel are used as a DL channel. For example, user data, higher layer control information, and a system information block (SIB) are transmitted by the PDSCH. A master information block (MIB) is transmitted by the PBCH.

The L1/L2 control channel includes a downlink control channel (physical downlink control channel (PDCCH) and enhanced physical downlink control channel (EPDCCH)), a physical control format indicator channel (PCFICH), and a physical hybrid-ARQ indicator channel (PHICH). For example, downlink control information (DCI) including scheduling information for the PDSCH and PUSCH are transmitted by the PDCCH. The OFDM symbol number used in the PDCCH is transmitted by a PCFICH. Delivery acknowledgment information (ACK/NACK) on an HARQ to the PUSCH is transmitted by a PHICH. The EPDCCH is subject to frequency division multiplexing together with the PDSCH (downlink shared data channel), and used for transmitting, for example, DCI similarly to the PDCCH.

In the radio communication system 1, for example, an uplink data channel (physical uplink shared channel (PUSCH), also referred to as, for example, an uplink shared channel) shared by the user terminals 20, uplink control channel (physical uplink control channel (PUCCH)), and a random access channel (physical random access channel (PRACH)) are used as a UL channel. User data and higher layer control information are transmitted by the PUSCH. Uplink control information (UCI) including at least one of, for example, delivery acknowledgment information (ACK/NACK) and radio quality information (CQI) is transmitted by the PUSCH or the PUCCH. A random access preamble for establishing connection with a cell is transmitted by the PRACH.

<Base Station>

Figure 5:
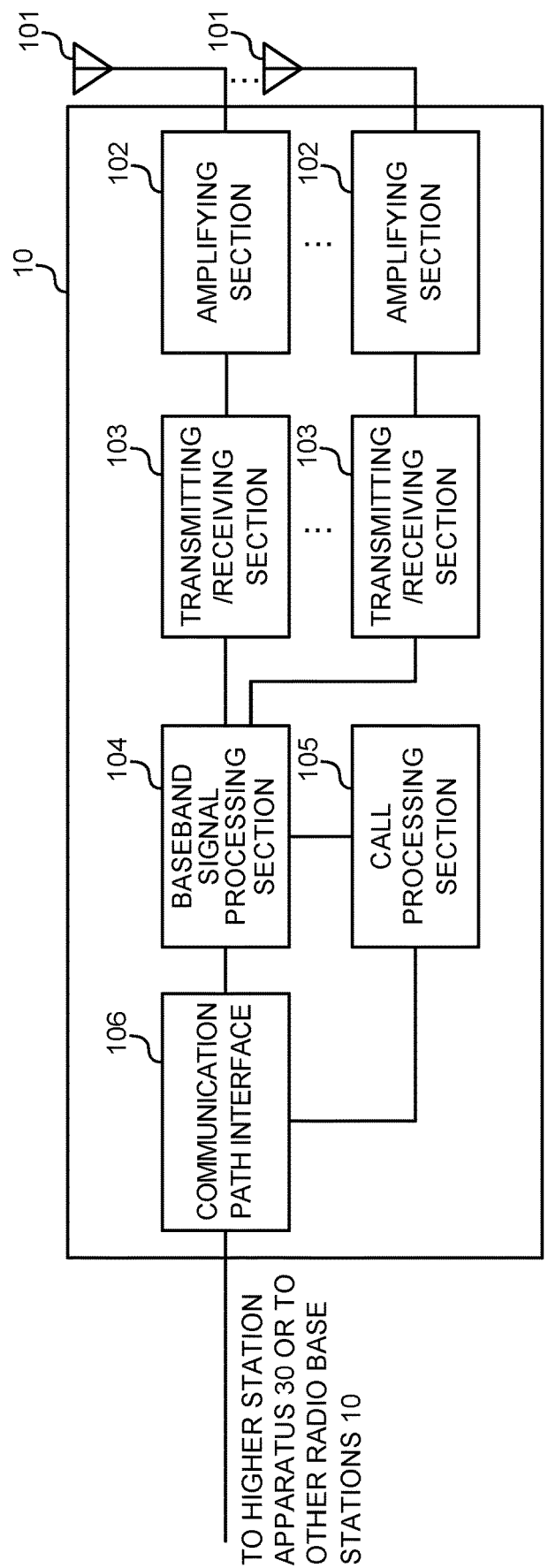
FIG. 5 illustrates one example of the functional configuration of a radio base station according to the present embodiment.

FIG. 5 illustrates one example of the entire configuration of a base station according to the present embodiment. A base station 10 includes a plurality of transmission/reception antennas 101, amplifying section 102, transmitting/receiving section 103, a baseband signal processing section 104, a call processing section 105, and a communication path interface 106. One or more transmission/reception antennas 101, one or more amplifying section 102, and one or more transmitting/receiving section 103 are required to be included. The base station 10 is a transmission apparatus for downlink data, and may be a reception apparatus for uplink data.

Downlink data transmitted from the base station 10 to the user terminal 20 is input from the host station apparatus 30 to the baseband signal processing section 104 via the communication path interface 106.

In the baseband signal processing section 104, transmission processing is performed on downlink data, and the downlink data is transferred to a transmitting/receiving section 103. The transmission processing includes processing of a packet data convergence protocol (PDCP) layer, division/coupling of user data, radio link control (RLC) layer transmission processing such as RLC retransmission control, medium access control (MAC) retransmission control (e.g., HARQ transmission processing), scheduling, transmission format selection, channel encoding, inverse fast Fourier transform (IFFT) processing, and precoding processing. Transmission processing such as channel encoding and inverse fast Fourier transform is performed on a downlink control signal, and the downlink control signal is transferred to the transmitting/receiving section 103.

The transmitting/receiving section 103 converts a base band signal output from the baseband signal processing section 104 after being precoded in each antenna into a signal in a radio frequency band, and transmits the signal. The radio frequency signal having been subjected to frequency conversion in the transmitting/receiving section 103 is amplified by the amplifying section 102, and transmitted from the transmission/reception antenna 101. The transmitting/receiving section 103 can include a transmitter/receiver, a transmission/reception circuit, and a transmission/reception apparatus, which are described based on common recognition in the technical field according to the present invention. The transmitting/receiving section 103 may be configured as an integrated transmitting/receiving section, or may include a transmitting section and a receiving section.

As for an uplink signal, the amplifying section 102 amplifies a radio frequency signal received by a transmission/reception antenna 101. The transmitting/receiving section 103 receives the uplink signal amplified by the amplifying section 102. The transmitting/receiving section 103 performs frequency conversion to convert a reception signal to a base band signal, and outputs the base band signal to the baseband signal processing section 104.

The baseband signal processing section 104 performs fast Fourier transform (FFT) processing, inverse discrete Fourier transform (IDFT) processing, error correction decoding, reception processing of MAC retransmission control, reception processing of an RLC layer and a PDCP layer on user data contained in an input uplink signal, and transfers the user data to the host station apparatus 30 via the communication path interface 106. The call processing section 105 performs call processing, such as setting and releasing of a communication channel, state management of the base stations 10, and management of radio resources.

The communication path interface 106 transmits/receives a signal to/from the host station apparatus 30 via a given interface. The communication path interface 106 may transmit/receive a signal (perform backhaul signaling) to/from another base station 10 via an interface (e.g., an optical fiber compliant with a common public radio interface (CPRI) and an X2 interface) between base stations.

The transmitting/receiving section 103 may further include an analog beam forming unit that performs analog beam forming. The analog beam forming unit can include an analog beam forming circuit (e.g., phase shifter and phase shift circuit) or an analog beam forming apparatus (e.g., phase shift instrument), which are described based on common recognition in the technical field according to the present invention. The transmission/reception antenna 101 can include an array antenna, for example. The transmitting/receiving section 103 is configured such that a single BF and a multi BF can be applied thereto.

The transmitting/receiving section 103 may transmit a signal by using a Tx beam, and may receive a signal by using a reception beam. The transmitting/receiving section 103 may transmit and receive a signal by using a given beam determined by a control section 301.

The transmitting/receiving section 103 transmits a downlink signal (e.g., downlink control signal (downlink control channel), downlink data signal (downlink data channel and downlink shared channel), downlink reference signal (e.g., DM-RS and CSI-RS), discovery signal, synchronization signal, and broadcast signal). The transmitting/receiving section 103 receives an uplink signal (e.g., uplink control signal (uplink control channel), uplink data signal (uplink data channel and uplink shared channel), and uplink reference signal).

The transmitting/receiving section 103 may receive a beam failure recovery request (BFRQ), and transmit a beam failure recovery request response (BFRQR) signal in a beam recovery procedure.

The transmitting section and the receiving section of the present invention include both of the transmitting/receiving section 103 and the communication path interface 106, or either one thereof.

Figure 6:
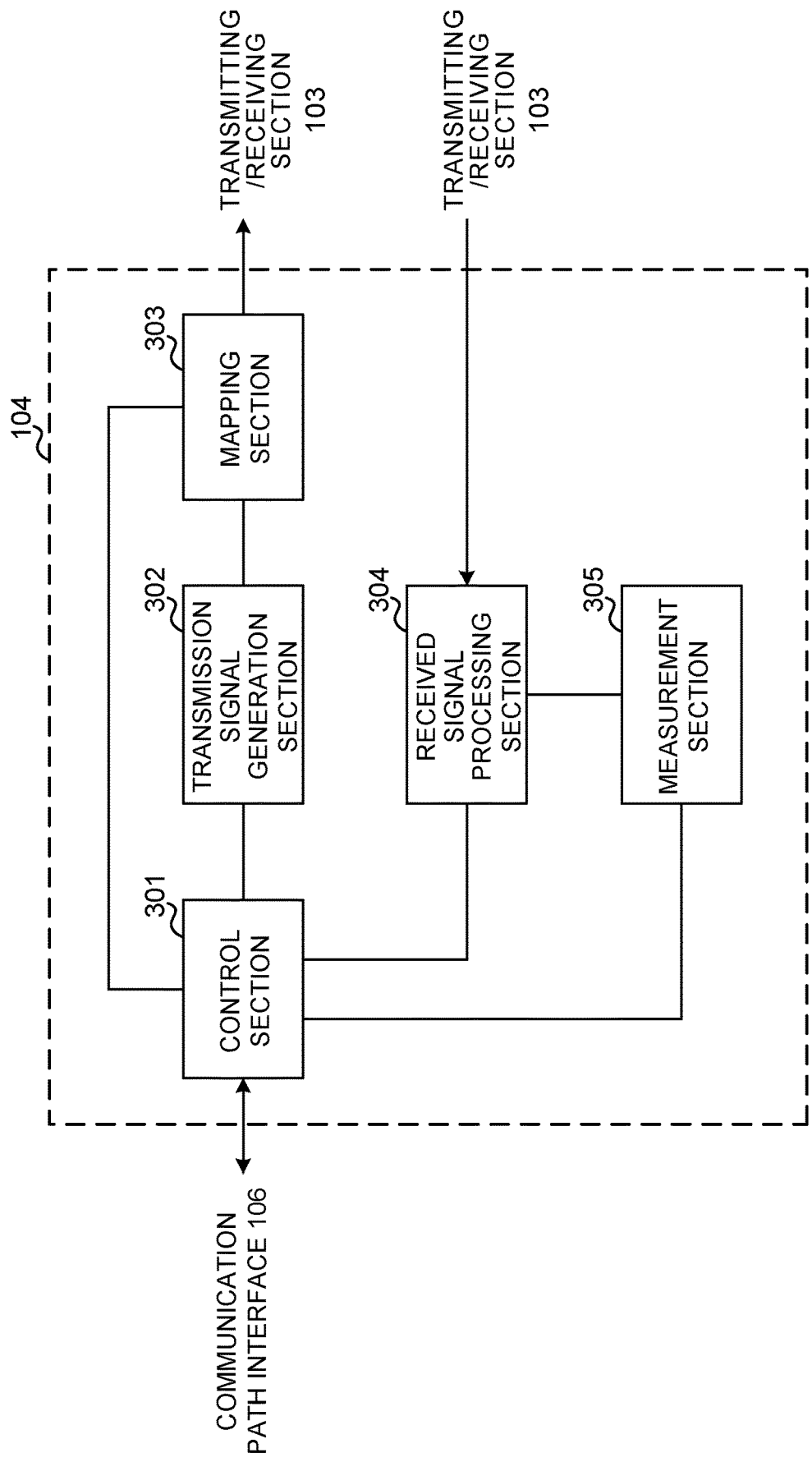
FIG. 6 illustrates one example of the functional configuration of a baseband signal processing section of the radio base station.

FIG. 6 illustrates one example of the functional configuration of a base station according to the present embodiment. The figure mainly illustrates functional blocks of a characteristic part in the present embodiment. The base station 10 includes other functional blocks necessary for radio communication. The baseband signal processing section 104 includes at least the control section 301, a transmission signal generation section 302, a mapping section 303, a received signal processing section 304, and a measurement section 305.

The control section 301 controls the entire base station 10. The control section 301 can include a controller, a control circuit, and a control apparatus, which are described based on common recognition in the technical field according to the present invention.

The control section 301 controls signal generation performed by the transmission signal generation section 302 and signal assignment performed by the mapping section 303. The control section 301 controls signal reception processing performed by the received signal processing section 304 and signal measurement performed by the measurement section 305.

The control section 301 controls scheduling (e.g., resource assignment) of a downlink signal and an uplink signal. Specifically, the control section 301 controls the transmission signal generation section 302, the mapping section 303, and the transmitting/receiving section 103 so that DCI (DL assignment and DL grant) containing scheduling information of a downlink data channel and DCI (UL grant) containing scheduling information of an uplink data channel are generated and transmitted.

The transmission signal generation section 302 generates a downlink signal (downlink control channel, downlink data channel, and downlink reference signal such as DM-RS), and outputs the downlink signal to the mapping section 303 based on an instruction from the control section 301. The transmission signal generation section 302 can include a signal generator, a signal generation circuit, and a signal generation apparatus, which are described based on common recognition in the technical field according to the present invention.

The mapping section 303 maps the downlink signal generated by the transmission signal generation section 302 to a given radio resource, and outputs the downlink signal to the transmitting/receiving section 103 based on an instruction from the control section 301. The mapping section 303 can include a mapper, a mapping circuit, and a mapping apparatus, which are described based on common recognition in the technical field according to the present invention.

The received signal processing section 304 performs reception processing (e.g., demapping, demodulation, and decoding) on a reception signal input from the transmitting/receiving section 103. For example, the reception signal is an uplink signal (e.g., uplink control channel, uplink data channel, and uplink reference signal) transmitted from the user terminal 20. The received signal processing section 304 can include a signal processor, a signal processing circuit, and a signal processing apparatus, which are described based on common recognition in the technical field according to the present invention.

The received signal processing section 304 outputs information decoded by reception processing to the control section 301. For example, the reception processing unit 304 outputs at least one of a preamble, control information, and UL data to the control section 301. The received signal processing section 304 also outputs a reception signal and a signal after reception processing to the measurement section 305.

The measurement section 305 measures a received signal. The measurement section 305 can include a measurement instrument, a measurement circuit, and a measurement apparatus, which are described based on common recognition in the technical field according to the present invention.

The measurement section 305 may measure, for example, received power of a received signal (e.g., reference signal received power (RSRP)), received quality (e.g., reference signal received quality (RSRQ)), and a channel state. A measurement result may be output to the control section 301.

<User Terminal>

Figure 7:
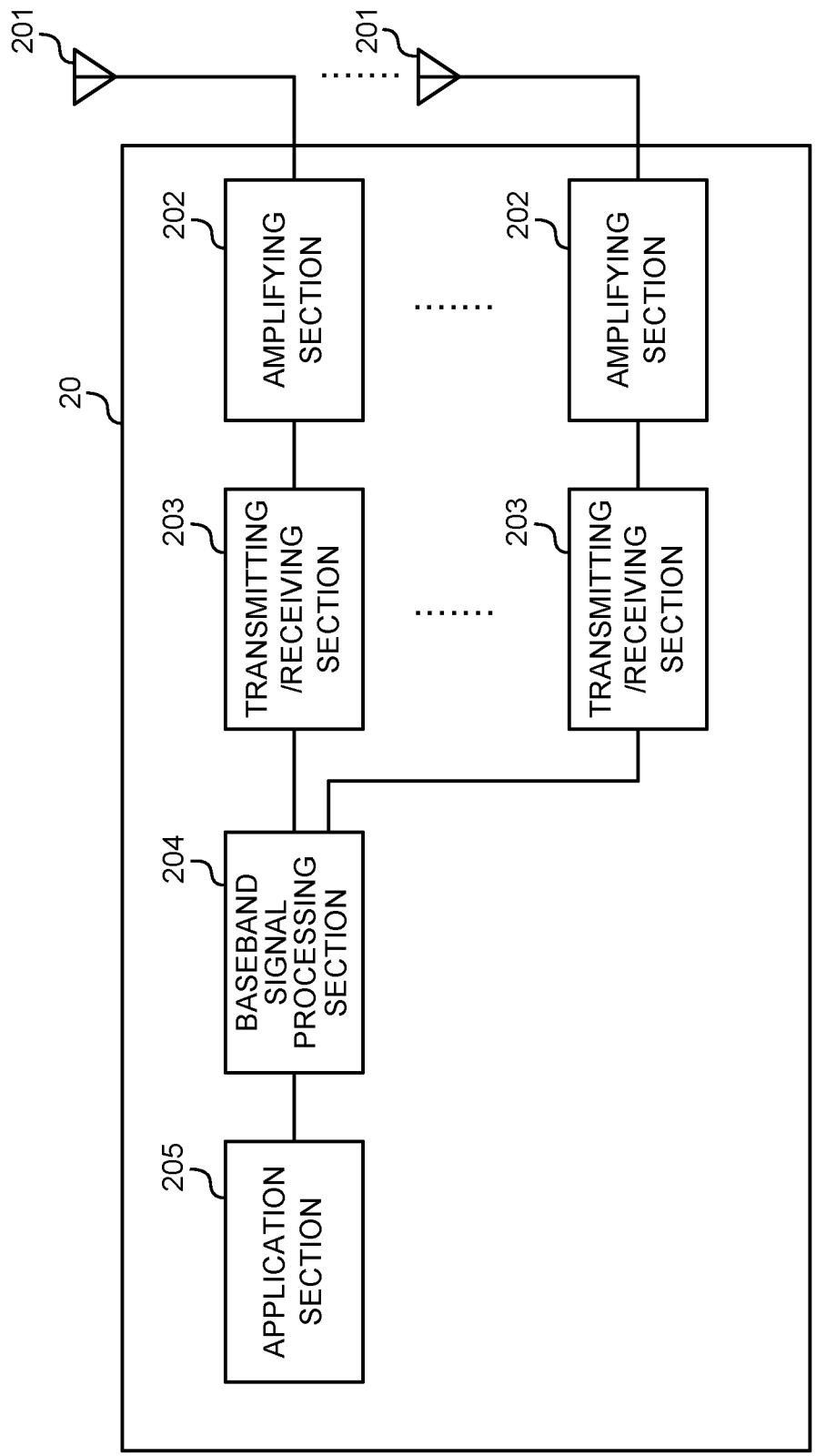
FIG. 7 illustrates one example of the functional configuration of a user terminal according to the present embodiment.

FIG. 7 illustrates one example of the entire configuration of a user terminal according to the present embodiment. The user terminal 20 includes a plurality of transmission/reception antennas 201, amplifying section 202, transmitting/receiving section 203, a baseband signal processing section 204, and an application section 205. One or more transmission/reception antennas 201, one or more amplifying section 202, and one or more transmitting/receiving section 203 are required to be included. The user terminal 20 is a reception apparatus for downlink data, and may be a transmission apparatus for uplink data.

A radio frequency signal received by a transmission/reception antenna 201 is amplified by an amplifying section 202. A transmitting/receiving section 203 receives a downlink signal amplified by the amplifying section 202. The transmitting/receiving section 203 performs frequency conversion to convert a reception signal to a base band signal, and outputs the base band signal to the baseband signal processing section 204. The transmitting/receiving section 203 can include a transmitter/receiver, a transmission/reception circuit, and a transmission/reception apparatus, which are described based on common recognition in the technical field according to the present invention. The transmitting/receiving section 203 may be configured as an integrated transmitting/receiving section, or may include a transmitting section and a receiving section.

The baseband signal processing section 204 performs reception processing, such as FFT processing, error correction decoding, and retransmission control, on an input base band signal. Downlink data is transferred to the application section 205. The application section 205 performs processing on a layer higher than the physical layer and the MAC layer. System information and higher layer control information among downlink data are also transferred to the application section 205.

Uplink user data is input from the application section 205 to the baseband signal processing section 204. The baseband signal processing section 204 performs, for example, transmission processing of retransmission control (e.g., HARQ transmission processing), channel encoding, precoding, discrete Fourier transform (DFT) processing, and IFFT precoding, and performs transfer to the transmitting/receiving section 203. The transmitting/receiving section 203 converts a base band signal output from the baseband signal processing section 204 into a signal in a radio frequency band, and transmits the signal. The radio frequency signal having been subjected to frequency conversion in the transmitting/receiving section 203 is amplified by the amplifying section 202, and transmitted from the transmission/reception antenna 201.

The transmitting/receiving section 203 may further include an analog beam forming unit that performs analog beam forming. The analog beam forming unit can include an analog beam forming circuit (e.g., phase shifter and phase shift circuit) or an analog beam forming apparatus (e.g., phase shift instrument), which are described based on common recognition in the technical field according to the present invention. The transmission/reception antenna 201 can include, for example, an array antenna. The transmitting/receiving section 203 is configured such that a single BF and a multi BF can be applied thereto.

The transmitting/receiving section 203 may transmit a signal by using a Tx beam, and may receive a signal by using a reception beam. The transmitting/receiving section 203 may transmit and receive a signal by using a given beam determined by a control section 401.

The transmitting/receiving section 203 receives a downlink signal (e.g., downlink control signal (downlink control channel), downlink data signal (downlink data channel and downlink shared channel), downlink reference signal (e.g., DM-RS and CSI-RS), discovery signal, synchronization signal, and broadcasting signal). The transmitting/receiving section 203 transmits an uplink signal (e.g., uplink control signal (uplink control channel), uplink data signal (uplink data channel and uplink shared channel), and uplink reference signal).

The transmitting/receiving section 203 may transmit a beam failure recovery request (BFRQ), and receive a beam failure recovery request response (BFRQR) signal in a beam recovery procedure.

The transmitting/receiving section 203 may monitor at least one of search space for a beam failure recovery request response (BFRQR) signal (first search space) and another piece of search space (second search space) based on monitor settings related to these pieces of search space.

Figure 8:
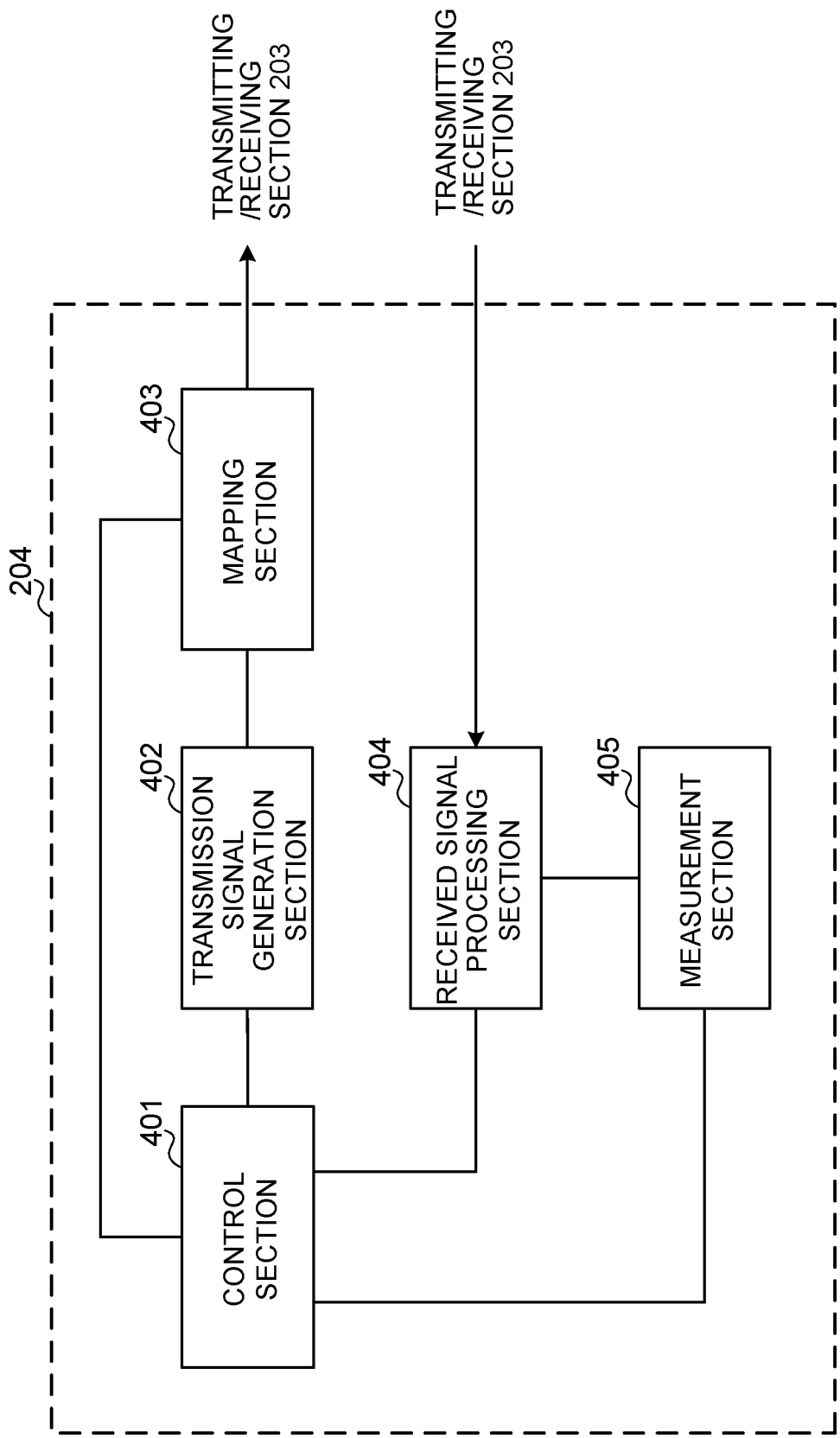
FIG. 8 illustrates one example of the functional configuration of a baseband signal processing section of the user terminal.

FIG. 8 illustrates one example of the functional configuration of the user terminal according to the present embodiment. The figure mainly illustrates functional blocks of a characteristic part in the present embodiment. The user terminal 20 includes other functional blocks necessary for radio communication. The baseband signal processing section 204 in the user terminal 20 includes at least the control section 401, a transmission signal generation section 402, a mapping section 403, a received signal processing section 404, and a measurement section 405.

The control section 401 controls the entire user terminal 20. The control section 401 can include a controller, a control circuit, and a control apparatus, which are described based on common recognition in the technical field according to the present invention.

The control section 401 controls signal generation performed by the transmission signal generation section 402 and signal assignment performed by the mapping section 403. The control section 401 controls signal reception processing performed by the received signal processing section 404 and signal measurement performed by the measurement section 405.

The control section 401 may control monitor settings related to the search space for a beam failure recovery request response (BFRQR) signal (first search space) and another piece of search space (second search space) in accordance with a carrier (PCell, PSCell, or SCell) for which the search space for a beam failure recovery request response (BFRQR) signal (first search space) is set.

The control section 401 may control the monitor settings related to search space under the condition of whether the search space for a beam failure recovery request response (BFRQR) signal (first search space) and another piece of search space (second search space) have the same subcarrier spacing (SCS).

The control section 401 may control the monitor settings related to search space under the condition of whether the search space for a beam failure recovery request response (BFRQR) signal (first search space) and the other piece of search space (second search space) have a relation of QCL type D.

The control section 401 may control the monitor settings related to search space under the condition whether or not the other search space (second search space) is common search space.

The control section 401 may control monitor settings related to search space so that monitor setting related to search space in a previous section is not used after detecting the beam failure recovery request response (BFRQR) signal.

The transmission signal generation section 402 generates an uplink signal (e.g., uplink control channel, uplink data channel, and uplink reference signal), and outputs the uplink signal to the mapping section 403 based on an instruction from the control section 401. The transmission signal generation section 402 can include a signal generator, a signal generation circuit, and a signal generation apparatus, which are described based on common recognition in the technical field according to the present invention.

The transmission signal generation section 402 generates an uplink data channel based on an instruction from the control section 401. For example, when a downlink control channel announced from the base station 10 contains UL grant, the control section 401 instructs the transmission signal generation section 402 to generates an uplink data channel.

The mapping section 403 maps the uplink signal generated by the transmission signal generation section 402 to a radio resource, and outputs the downlink signal to the transmitting/receiving section 203 based on an instruction from the control section 401. The mapping section 403 can include a mapper, a mapping circuit, and a mapping apparatus, which are described based on common recognition in the technical field according to the present invention.

The received signal processing section 404 performs reception processing (e.g., demapping, demodulation, and decoding) on a reception signal input from the transmitting/receiving section 203. For example, the reception signal is a downlink signal (downlink control channel, downlink data channel, and downlink reference signal) transmitted from the base station 10. The received signal processing section 404 can include a signal processor, a signal processing circuit, and a signal processing apparatus, which are described based on common recognition in the technical field according to the present invention. The received signal processing section 404 can constitute a receiving section according to the present invention.

The received signal processing section 404 performs blind decoding on a downlink control channel that schedules transmission and reception of a downlink data channel based on an instruction from the control section 401, and performs reception processing on the downlink data channel based on the DCI. The received signal processing section 404 estimates channel gain based on a DM-RS or a CRS, and demodulates the downlink data channel based on the estimated channel gain.

The received signal processing section 404 outputs information decoded by the reception processing to the control section 401. The received signal processing section 404 outputs, for example, broadcasting information, system information, RRC signaling, and DCI to the control section 401. The received signal processing section 404 may output a data decoding result to the control section 401. The received signal processing section 404 outputs a reception signal and a signal after the reception processing to the measurement section 405.

The measurement section 405 measures a received signal. The measurement section 405 can include a measurement instrument, a measurement circuit, and a measurement apparatus, which are described based on common recognition in the technical field according to the present invention.

The measurement section 405 may measure, for example, received power of a received signal (e.g., RSRP), DL received quality (e.g., RSRQ), and a channel state. A measurement result may be output to the control section 401.

(Hardware Configuration)

The block diagrams used for describing the embodiment illustrate blocks in functional units. These functional blocks (components) may be implemented in any combination of at least one of hardware and software. The method for implementing each functional block is not particularly limited. That is, each functional block may be implemented by one physically or logically coupled apparatus, or may be implemented by directly or indirectly connecting two or more physically or logically separate apparatuses (e.g., by wire or wirelessly) and using these plurality of apparatuses. A functional block may be implemented by combining software with the above-described one apparatus or the above-described plurality of apparatuses.

Here, the function include, but is not limited to, deciding, determining, judging, calculating, computing, processing, deriving, investigating, searching, ascertaining, receiving, transmitting, outputting, accessing, solving, selecting, choosing, establishing, comparing, assuming, expecting, deeming, broadcasting, notifying, communicating, forwarding, configuring, reconfiguring, allocating, mapping, and assigning. For example, a functional block (component) that causes transmission to function may be designated as, for example, a transmitting unit or a transmitter. In any case, as described above, the implementation method is not particularly limited.

Figure 9:
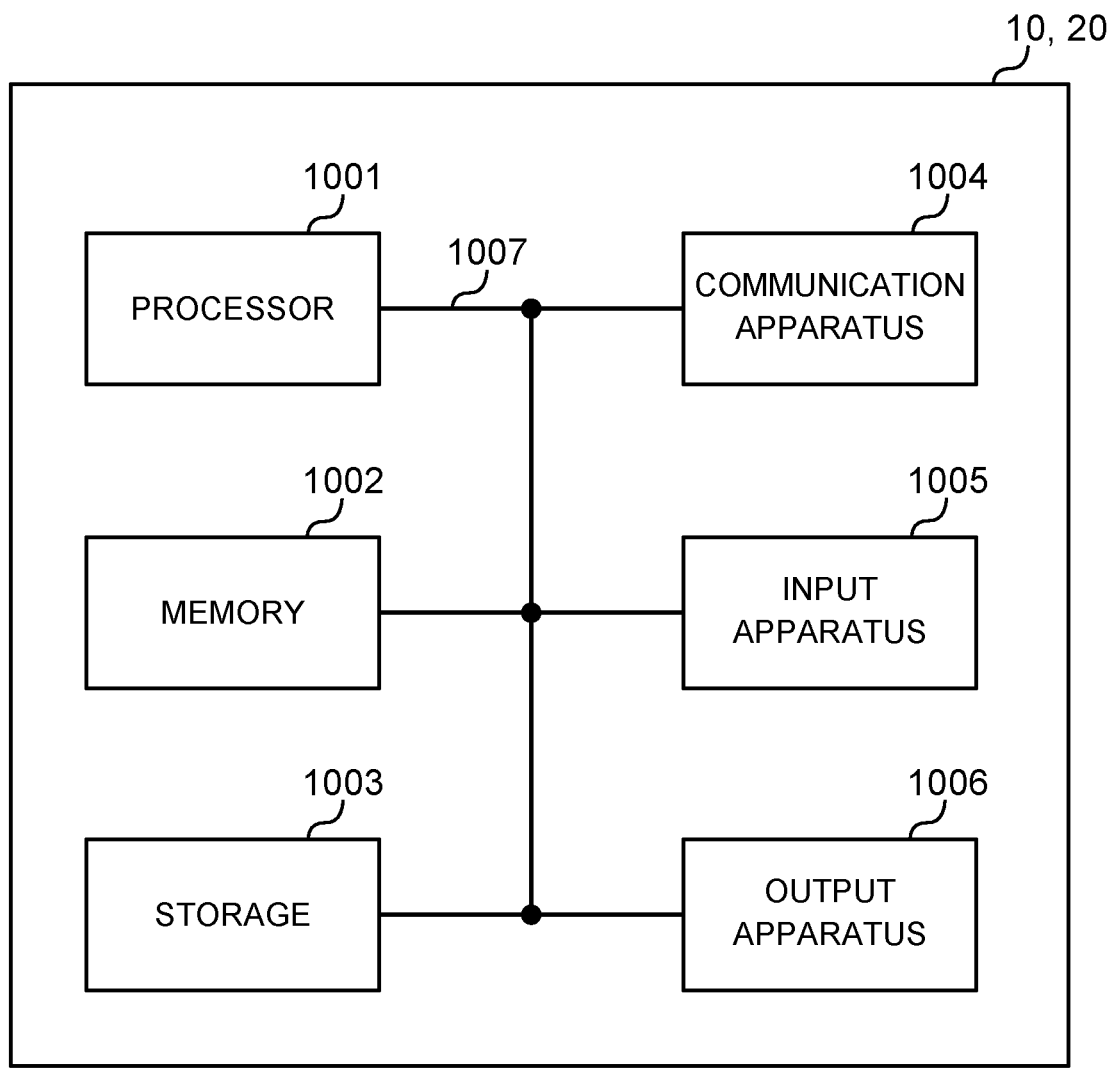
FIG. 9 illustrates one example of the hardware configuration of the radio base station and the user terminal according to one embodiment of the present invention.

For example, the base station and the user terminals according to one embodiment of the present disclosure may function as a computer that performs processing in the radio communication method of the present disclosure. FIG. 9 illustrates one example of the hardware configuration of a base station and a user terminal according to one embodiment. The base station 10 and user terminal 20 described above may be physically configured as a computer apparatus including a processor 1001, a memory 1002, a storage 1003, a communication apparatus 1004, an input apparatus 1005, an output apparatus 1006, and a bus 1007.

In the present disclosure, the word such as an apparatus, a circuit, a device, a section, and a unit can be replaced with each other. The base station 10 and the user terminal 20 may have a hardware configuration in which one or a plurality of apparatuses illustrated in the figures is included or a hardware configuration in which part of apparatuses is not included.

For example, although only one processor 1001 is illustrated, a plurality of processors may be provided. One processor may execute processing, and two or more processors may execute the processing simultaneously, sequentially, or by using another method. The processor 1001 may be implemented by one or more chips.

For example, each function of the base station 10 and the user terminal 20 is implemented by the processor 1001 controlling communication via the communication apparatus 1004 by performing operation and controlling at least one of reading and writing of data in the memory 1002 and the storage 1003 by reading given software (program) on hardware such as the processor 1001 and the memory 1002.

For example, the processor 1001 controls the entire computer by running an operating system. The processor 1001 may include a central processing unit (CPU), which includes an interface with peripheral equipment, a control apparatus, an arithmetic apparatus, and a register. For example, the processor 1001 may implement, for example, the above-described baseband signal processing section 104 (204) and the call processing section 105.

The processor 1001 reads, for example, a program (program code), a software module, and data from at least one of the storage 1003 and the communication apparatus 1004 to the memory 1002, and executes various pieces of processing in accordance therewith. A program causing a computer to execute at least a part of the operations described in the above-described embodiment is used as a program. For example, the control section 401 of the user terminal 20 may be implemented by a control program that is stored in the memory 1002 and operates in the processor 1001. Other functional blocks may be similarly implemented.

The memory 1002 is a computer-readable recording medium, and may be configured by at least one of a read only memory (ROM), an erasable programmable ROM (EPROM), an electrically EPROM (EEPROM), a random access memory (RAM), and other appropriate storage media. The memory 1002 may be referred to as, for example, a register, a cache, and a main memory (main storage apparatus). The memory 1002 can store, for example, a program (program code) that can be executed for performing a radio communication method according to one embodiment of the present disclosure and a software module.

The storage 1003 is a computer-readable recording medium, and may be configured by, for example, at least one of a flexible disk, a floppy (registered trademark) disk, a magneto-optical disk (e.g., compact disc (compact disc ROM (CD-ROM)), a digital versatile disc, a Blu-ray (registered trademark) disk), a removable disk, a hard disk drive, a smart card, a flash memory device (e.g., card, stick, and key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication via at least one of a wired network and a wireless network, and is referred to as a network device, a network controller, a network card, and a communication module. The communication apparatus 1004 may include a high-frequency switch, a duplexer, a filter, and a frequency synthesizer in order to achieve at least one of, for example, frequency division duplex (FDD) and time division duplex (TDD). The communication apparatus 1004 may implement the transmission/reception antenna 101 (201), the amplifying section 102 (202), the transmitting/receiving section 103 (203), and the communication path interface 106 as described above. The transmitting/receiving section 103 (203) may be implemented in a physically or logically separated manner by the transmitting section 103a (203a) and the receiving section 103b (203b).

The input apparatus 1005 is an input device (e.g., keyboard, mouse, microphone, switch, button, and sensor) that receives input from the outside. The output apparatus 1006 is an output device (e.g., display, speaker, and light emitting diode (LED) lamp) that performs output to the outside. The input apparatus 1005 and the output apparatus 1006 may have an integrated configuration (e.g., touch panel).

The apparatuses such as the processor 1001 and the memory 1002 are connected by the bus 1007 for communicating information. The bus 1007 may include a single bus, or may include different buses for each pair of apparatuses.

The base station 10 and the user terminal 20 may include hardware such as a microprocessor, a digital signal processor (DSP), an application specific integrated circuit (ASIC), a programmable logic device (PLD), and a field programmable gate array (FPGA). The hardware may implement a part or all of each functional block. For example, the processor 1001 may be implemented by using at least one of these pieces of hardware.

(Examples of Variation)

Terms described in the present disclosure and terms necessary for understanding the present disclosure may be replaced with other terms that have the same or similar meanings. For example, channels, symbols, and signals (or signaling) may be replaced with each other. The signal may be a message. A reference signal may be abbreviated as an RS, and may be referred to as, for example, a pilot and a pilot signal depending on a standard to be applied. A component carrier (CC) may be referred to as a cell, a frequency carrier, and a carrier frequency.

A radio frame may include one or a plurality of periods (frames) in a time domain. Each of one or a plurality of periods (frames) constituting a radio frame may be referred to as a subframe. The subframe may include one or a plurality of slots in the time domain. The subframe may be a fixed time length (e.g., 1 ms) that does not depend on numerology.

Here, the numerology may be a communication parameter applied to at least one of transmission and reception of a certain signal or channel. For example, the numerology may indicate at least one of, for example, subcarrier spacing (SCS), a bandwidth, a symbol length, a cyclic prefix length, a transmission time interval (TTI), the number of symbols per TTI, radio frame configuration, specific filtering processing performed by a transceiver in a frequency domain, and specific windowing processing performed by a transceiver in the time domain.

The slot may include one or a plurality of symbols, for example, an orthogonal frequency division multiplexing (OFDM) symbol and a single carrier frequency division multiple access (SC-FDMA) symbol in a time domain. A slot may be a time unit based on numerology.

The slot may include a plurality of mini slots. Each mini slot may include one or a plurality of symbols in the time domain. The mini slot may be referred to as a subslot. The mini slot may include a smaller number of symbols than a slot. A PDSCH (or PUSCH) transmitted in a time unit larger than a mini slot may be referred to as a PDSCH (PUSCH) mapping type A. A PDSCH (or PUSCH) transmitted by using a mini slot may be referred to as a PDSCH (PUSCH) mapping type B.

A radio frame, a subframe, a slot, a mini slot, and a symbol all represent a time unit at the time when a signal is transmitted. The radio frame, the subframe, the slot, the mini slot, and the symbol may be each called by other corresponding designations.

For example, one subframe may be referred to as a transmission time interval (TTI). A plurality of sequential subframes may be referred to as a TTI. One slot or one mini slot may be referred to as a TTI. That is, at least one of a subframe and a TTI may be a subframe (1 ms) in an existing LTE, may be a period shorter than 1 ms (e.g., 1 to 13 symbols), or may be a period longer than 1 ms. A unit representing a TTI may be referred to as, for example, a slot and a mini slot instead of a subframe.

Here, the TTI refers to a minimum time unit of scheduling in radio communication, for example. For example, in an LTE system, scheduling is performed. In the scheduling, a base station assigns radio resources (e.g., frequency bandwidth and transmission power that can be used in each user terminal) to each user terminal in TTI units. The definition of the TTI is not limited thereto.

The TTI may be a transmission time unit such as a channel-encoded data packet (transport block), a code block, and a codeword, or may be a processing unit such as scheduling and link adaptation. When a TTI is given, a time section (e.g., symbol number) in which, for example, a transport block, a code block, and a codeword are actually mapped may be shorter than the TTI.

When one slot or one mini slot is referred to as a TTI, one or more TTIs (i.e., one or more slots or one or more mini slots) may be a minimum time unit of scheduling. The slot number (mini slot number) constituting the minimum time unit of the scheduling may be controlled.

A TTI having a time length of 1 ms may be referred to as, for example, a usual TTI (TTI in LTE Rel. 8 to 12), a normal TTI, a long TTI, a usual subframe, a normal subframe, a long subframe, and a slot. A TTI shorter than the usual TTI may be referred to as, for example, a shortened TTI, a short TTI, a partial TTI (partial or fractional TTI), a shortened subframe, a short subframe, a mini slot, a subslot, and a slot.

A long TTI (e.g., usual TTI or subframe) may be replaced with a TTI having a time length exceeding 1 ms. A short TTI (e.g., shortened TTI) may be replaced with a TTI having a TTI length less than the TTI length of the Long TTI and equal to or more than 1 ms.

A resource block (RB) is a resource allocation unit in a time domain and a frequency domain, and may include one or a plurality of sequential subcarriers in the frequency domain.

The resource block (RB) may include one or a plurality of symbols in the time domain, and may be one slot, one mini slot, one subframe, or the length of one TTI. Each of one TTI and one subframe may include one or a plurality of resource blocks.

One or a plurality of resource blocks (RBs) may be referred to as, for example, a physical resource block (physical RB (PRB)), a sub-carrier group (SCG), a resource element group (REG), a PRB pair, and an RB pair.

The resource block may include one or a plurality of resource elements (REs). For example, one RE may be a radio resource domain of one subcarrier and one symbol.

The structures of the above-described radio frame, subframe, slot, mini slot, and symbol are merely examples. For example, configurations of, for example, the number of subframes included in a radio frame, the number of slots per subframe or radio frame, the number of mini slots included in a slot, the number of symbols and resource blocks (RBs) included in a slot or a mini slot, the number of subcarriers included in a resource block (RB), the number of symbols in a TTI, a symbol length, and a cyclic prefix (CP) length can be variously changed.

For example, the information and the parameters described in the present disclosure may be represented by absolute values, relative values from a certain value, or other applicable pieces of information. For example, radio resources may be specified by a given index.

Names used for, for example, parameters in the present disclosure are in no respect limitative. For example, mathematical expressions using these parameters may differ from those explicitly disclosed in the present disclosure. Various channels such as a physical uplink control channel (PUCCH) and a physical downlink control channel (PDCCH) and information elements can be identified by any suitable names, and thus various names assigned to these various channels and information elements are in no respect limitative.

For example, the information and signals described in the present disclosure may be represented by using any of various different techniques. For example, data, instructions, commands, information, signals, bits, symbols, and chips, which may be referred to throughout the above description, may be represented by voltages, currents, electromagnetic waves, magnetic fields or particles, optical fields or photons, or any combination thereof.

For example, information and signals can be output at least one of from a higher layer to a lower layer and from a lower layer to a higher layer. For example, information and signals may be input and output via a plurality of network nodes.

For example, input or output information and signals may be stored in a specific location (e.g., memory), or may be managed by using a management table. For example, input or output information and signals may be overwritten, updated, or appended. For example, output information and signals may be deleted. For example, input information and signals may be transmitted to another apparatus.

Information may be announced not only by a method in the aspects/embodiment described in the present disclosure but by another method. For example, information may be announced by physical layer signaling (e.g., downlink control information (DCI), uplink control information (UCI)), higher layer signaling (e.g., radio resource control (RRC) signaling, broadcast information (e.g., master information block (MIB) and system information block (SIB)), medium access control (MAC) signaling), other signals, or combinations thereof.

The physical layer signaling may be referred to as, for example, Layer 1/Layer 2 (L1/L2) control information (L1/L2 control signal) and L1 control information (L1 control signal). The RRC signaling may be referred to as an RRC message, and may be, for example, an RRC connection setup message and an RRC connection reconfiguration message. The MAC signaling may be announced by using, for example, a MAC control element (MAC CE).

Given information may be announced (e.g., "being X" may be announced) not only explicitly but implicitly (e.g., by not announcing the given information or announcing another piece of information).

Judging may be performed by a value represented by one bit (0 or 1), may be performed by a Boolean value represented as true or false, or may be performed by comparing numerical values (e.g., comparison with a certain value).

Software should be widely interpreted to mean, for example, instructions, instruction sets, codes, code segments, program codes, programs, subprograms, software modules, applications, software applications, software packages, routines, subroutines, objects, executable files, execution threads, procedures, and functions, regardless of whether being referred to as software, firmware, middleware, a microcode, and a hardware description language or by another name.

For example, software, instructions, and information may be transmitted/received via a transmission medium. For example, when software is transmitted from a website, a server, or other remote sources by using at least one of a wired technique (e.g., coaxial cable, optical fiber cable, twisted pair, digital subscriber line (DSL)) and a wireless technique (e.g., infrared light and microwave), at least one of the wired technique and the wireless technique is included in the definition of the transmission medium.

The terms "system" and "network" used in the present disclosure can be compatibly used.

In the present disclosure, terms such as "precoding", "precoder", "weight (precoding weight)", "quasi-Co-Location (QCL)", "transmission configuration indication (TCI) state", "spatial relation", "spatial domain filter", "transmission power", "phase rotation", "antenna port", "antenna port group", "layer", "layer number", "rank", "resource", "resource set", "resource group", "beam", "beam width", "beam angle", "antenna", "antenna element", and "panel" can be compatibly used.

In the present disclosure, the terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)" can be compatibly used. The base station may be referred by a term such as a macro cell, a small cell, a femto cell, and a pico cell.

The base station can house one or a plurality of (e.g., three) cells (also referred to as "sectors"). When the base station houses a plurality of cells, the entire coverage area of the base station can be partitioned into a plurality of smaller areas. Each smaller area can provide communication service by using a base station subsystem (e.g., indoor small base station (remote radio head (RRH))). The term "cell" or "sector" refers to a part or all of a coverage area of at least one of a base station and a base station subsystem, which perform communication service in the coverage.

In the present disclosure, the terms such as a "mobile station (MS)", a "user terminal", "user equipment (UE)", and a "terminal" can be compatibly used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, and a client, or by some other appropriate terms.

At least one of the base station and the mobile station may be referred to as, for example, a transmission apparatus, a reception apparatus, and a communication apparatus. At least one of the base station and the mobile station may be, for example, a device mounted on a moving object and the moving object itself. The moving object may be a vehicle (e.g., car and airplane), an unmanned moving object (e.g., drone and autonomous vehicle), or a robot (of manned or unmanned type). At least one of the base station and the mobile station includes an apparatus that does not necessarily move during a communication operation. For example, at least one of the base station and the mobile station may be an Internet of Things (IoT) device such as a sensor.

The base stations in the present disclosure may be replaced with a user terminal. For example, each aspect/embodiment of the present disclosure may be applied to a configuration in which communication between a base station and a user terminal is replaced with communication among a plurality of user terminals (which may be referred to as, for example, device-to-device (D2D) and vehicle-to-everything (V2X)). In the case, a configuration in which the user terminal 20 has the function of the above-described base station 10 may be adopted. Words such as "uplink" and "downlink" may be replaced with words corresponding to inter-terminal communication (e.g., "side"). For example, an uplink channel and a downlink channel may be replaced with a side channel.

Similarly, a user terminal in the present disclosure may be replaced with a base station. In the case, a configuration in which the base station 10 has the function of the above-described user terminal 20 may be adopted.

In the present disclosure, an operation performed by a base station may be performed by an upper node thereof in some cases. In a network including one or a plurality of network nodes having a base station, various operations performed for communication with a terminal can be clearly performed by a base station, one or more network nodes (for example, a mobility management entity (MME) and a serving-gateway (S-GW) can be considered, but not limited thereto) other than the base station, or a communication thereof.

Each aspect/embodiment described in the present disclosure may be used alone, used in a combination, and switched in association with execution. For example, the order of a processing procedure, a sequence, and a flowchart of each aspect/embodiment described in the present disclosure may be changed as long as there is no inconsistencies. For example, although various step elements have been presented by using an illustrative order for the method described in the present disclosure, the method is not limited to the presented specific order.

Each aspect/embodiment described in the present disclosure may be applied to a system using long term evolution (LTE), LTE-Advanced (LTE-A), LTE-Beyond (LTE-B), SUPER 3G, IMT-Advanced, 4th generation mobile communication system (4G), 5th generation mobile communication system (5G), future radio access (FRA), new radio access technology (New-RAT), New Radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and other appropriate radio communication methods and a next generation system expanded based on these methods. A plurality of systems may be applied in a combination (e.g., combination of LTE or LTE-A and 5G).

The description "based on" used in the present disclosure does not mean "based only on", unless otherwise stipulated. In other words, the description "based on" means both "based only on" and "based at least on."

Any reference to elements using a designation such as "first" and "second" used in the present disclosure does not generally limit amounts or order of these elements. These designations can be used in the present disclosure as a convenient method for distinguishing two or more elements. Reference to the first and second elements does not mean that only two elements may be adopted, or that the first element is required to precede the second element in some way.

The term "deciding (determining)" used in the present disclosure may encompass a wide variety of operations. For example, "deciding (determining)" may be regarded as "deciding (determining)", for example, judging, calculating, computing, processing, deriving, investigating, searching (looking up, search, and inquiry) (e.g., searching a table, a database, or another data structure), and ascertaining.

"Deciding (determining)" may be regarded as "deciding (determining)", for example, receiving (e.g., receiving information), transmitting (e.g., transmitting information), input, output, and accessing (e.g., accessing data in a memory).

"Deciding (determining)" may be regarded as "deciding (determining)", for example, resolving, selecting, choosing, establishing, and comparing. That is, "deciding (determining)" may be regarded as "deciding (determining)" some operation.

"Deciding (determining)" may be replaced with, for example, "assuming", "expecting", and "considering".

The "maximum transmission power" described in the present disclosure may mean a maximum value of transmission power, nominal UE maximum transmit power, or rated UE maximum transmit power.

Terms "connected" and "coupled" or any other variation thereof used in the present disclosure mean any of direct or indirect connection or coupling between two or more elements. One or more intermediate elements can be placed between two elements that are "connected" or "coupled" with each other. Elements may be coupled or connected physically, logically, or in a combination of physical and logical manners. For example, "connection" may be replaced with "access."

When two elements are connected in the present disclosure, the two elements can be considered to be "connected" or "coupled" with each other by using, for example, one or more electrical wires, a cable, and print electrical connection, and by using electromagnetic energy having a wavelength of a radio frequency domain, a microwave domain, or a light (both of visible and invisible light) domain in some non-limiting and non-inclusive examples.

In the present disclosure, a phrase "A and B are different" may mean "A and B are different from each other." The terms such as "separated" and "coupled" may be similarly interpreted.

When "include", "including", and variations thereof are used in the present disclosure, these terms are intended to be inclusive, similarly to the term "comprising". The term "or" used in the present disclosure is intended not to be an exclusive-OR.

In the present disclosure, when an article, such as "a", "an", and "the" in English, is added in translation, the present disclosure may include a case where the noun following such an article is in a plural form.

Although the invention according to the present disclosure has been described in detail above, it is obvious to a person skilled in the art that the invention according to the present disclosure is not limited to the embodiment described in the present disclosure. The invention according to the present disclosure can be implemented as an alteration and a modification without departing from the spirit and scope of the invention defined based on claims. The description of the present disclosure is provided for the purpose of exemplification and explanation, and have no limitative meaning to the invention according to the present disclosure.

The invention claimed is:

1. A terminal comprising:
a processor that performs a control, when a first search space for a beam failure recovery request response signal is configured in a primary cell (PCell), to monitor a first physical downlink control channel (PDCCH) in the first search space and a second PDCCH in a second search space other than the first search space; and
a receiver that monitors at least one of the first PDCCH in the first search space and the second PDCCH in the second search space,
wherein the processor performs a control to monitor the second PDCCH in the second search space in response to a demodulation reference signal (DMRS) of the first PDCCH in the first search space and a DMRS of the second PDCCH in the second search space having a quasi-co-location (QCL) type D relationship, and a symbol of the second PDCCH in the second search space overlaps a symbol of the first PDCCH in the first search space, and
wherein the processor performs a control to not monitor the second PDCCH in the second search space in response to the DMRS of the first PDCCH in the first search space and the DMRS of the second PDCCH in the second search space not having the QCL type D relationship, and the symbol of the second PDCCH in the second search space overlaps the symbol of the first PDCCH in the first search space.

2. A radio communication method for a terminal, comprising:
performing a control, when a first search space for a beam failure recovery request response signal is configured in a primary cell (PCell), to monitor a first physical downlink control channel (PDCCH) in the first search space and a second PDCCH in a second search space other than the first search space in response to a demodulation reference signal (DMRS) of the first PDCCH in the first search space and a DMRS of the second PDCCH in the second search space having a quasi-co-location (QCL) type D relationship, and a symbol of the second PDCCH in the second search space overlaps a symbol of the first PDCCH in the first search space;
performing a control to not monitor the second PDCCH in the second search space in response to the DMRS of the first PDCCH in the first search space and the DMRS of the second PDCCH in the second search space not having the QCL type D relationship, and the symbol of the second PDCCH in the second search space overlaps the symbol of the first PDCCH in the first search space; and
monitoring at least one of the first PDCCH in the first search space and the second PDCCH in the second search space.

3. A base station comprising:
a receiver that receives a beam failure recovery request from a terminal; and
a processor that performs a control, when the base station configures a first search space for a beam failure recovery request response signal in a primary cell (PCell), to transmit a first physical downlink control channel (PDCCH) in the first search space and a second PDCCH in a second search space other than the first search space,
wherein the processor performs a control to transmit the second PDCCH in the second search space in response to a demodulation reference signal (DMRS) of the first PDCCH in the first search space and a DMRS of the second PDCCH in the second search space having a quasi-co-location (QCL) type D relationship, and a symbol of the second PDCCH in the second search space overlaps a symbol of the first PDCCH in the first search space, and
wherein the processor performs a control to not transmit the second PDCCH in the second search space in response to the DMRS of the first PDCCH in the first search space and the DMRS of the second PDCCH in the second search space not having the QCL type D relationship, and the symbol of the second PDCCH in the second search space overlaps the symbol of the first PDCCH in the first search space.

4. A system comprising a base station and a terminal, wherein:
the base station comprises:
a first receiver that receives a beam failure recovery request from the terminal; and
a first processor that performs a control, when the base station configures a first search space for a beam failure recovery request response signal in a primary cell (PCell), to transmit a first physical downlink control channel (PDCCH) in the first search space and a second PDCCH in a second search space other than the first search space,
wherein the first processor performs a control to transmit the second PDCCH in the second search space in response to a demodulation reference signal (DMRS) of the first PDDCH in the first search space and a DMRS of the second PDCCH in the second search space having a quasi-co-location (QCL) type D relationship, and a symbol of the second PDCCH in the second search space overlaps a symbol of the first PDCCH in the first search space, and
wherein the first processor performs a control to not transmit the second PDCCH in the second search space in response to the DMRS of the first PDCCH in the first search space and the DMRS of the second PDCCH in the second search space not having the QCL type D relationship, and the symbol of the second PDCCH in the second search space overlaps the symbol of the first PDCCH in the first search space, and
the terminal comprises:
a second processor that performs a control, when the first search space for the beam failure recovery request response signal is configured in the PCell, to monitor the first PDCCH in the first search space and the second PDCCH in the second search space; and
a second receiver that monitors at least one of the first PDCCH in the first search space and the second PDCCH in the second search space,
wherein the second processor performs a control to monitor the second PDCCH in the second search space in response to the DMRS of the first PDCCH in the first search space and the DMRS of the second PDCCH in the second search space having the QCL type D relationship, and the symbol of the second PDCCH in the second search space overlaps the symbol of the first PDCCH in the first search space, and
wherein the second processor performs a control to not monitor the second PDCCH in the second search space in response to the DMRS of the first PDCCH in the first search space and the DMRS of the second PDCCH in the second search space not having the QCL type D relationship, and the symbol of the second PDCCH in the second search space overlaps the symbol of the first PDCCH in the first search space.

\* \* \* \* \*